United States Patent [19]

Kaida et al.

[11] Patent Number: 5,442,251
[45] Date of Patent: Aug. 15, 1995

[54] VIBRATING UNIT

[75] Inventors: Hiroaki Kaida; Jiro Inoue, both of Nagaokakyo, Japan

[73] Assignee: Murata Mfg. Co., Ltd., Japan

[21] Appl. No.: 387,391

[22] Filed: Feb. 13, 1995

Related U.S. Application Data

[63] Continuation of Ser. No. 87,478, Jul. 2, 1993, abandoned.

[30] Foreign Application Priority Data

| Jul. 3, 1992 | [JP] | Japan | 4-177068 |
| Jul. 14, 1992 | [JP] | Japan | 4-187135 |
| Jul. 16, 1992 | [JP] | Japan | 4-189726 |
| Jul. 23, 1992 | [JP] | Japan | 4-196914 |
| Jul. 27, 1992 | [JP] | Japan | 4-200037 |
| Aug. 11, 1992 | [JP] | Japan | 4-214152 |

[51] Int. Cl.$^6$ .......................................... H01L 41/08
[52] U.S. Cl. .................... 310/321; 310/348; 310/351; 310/367; 310/326
[58] Field of Search ............... 310/321, 326, 327, 348, 310/351, 353, 367, 368

[56] References Cited

U.S. PATENT DOCUMENTS

| 5,001,383 | 3/1991 | Kawashima | 310/367 |
| 5,059,853 | 10/1991 | Kawashima | 310/367 |
| 5,107,164 | 4/1992 | Kimura | 310/367 |
| 5,159,301 | 10/1992 | Kaida et al. | 310/370 X |
| 5,218,260 | 6/1993 | Kawashima | 310/361 |

OTHER PUBLICATIONS

J. P. Den Hartog, "Mechanical Vibrations", pp. 87–93, Dover Publications, Inc. New York, 1985.
Osamu Taniguchi, "Vibration Technology", pp. 113–116, Corona Publishing Co., Ltd.

Primary Examiner—Mark O. Budd
Attorney, Agent, or Firm—Ostrolenk, Faber, Gerb & Soffen

[57] ABSTRACT

Disclosed herein is a vibrating unit comprising vibration cancel means which is coupled to a vibration source through a vibration transfer part. The vibration cancel means receives vibration from the vibration source and resonates in a bending mode, to cancel vibration as propagated by a dynamic vibration absorbing phenomenon.

9 Claims, 26 Drawing Sheets (a)

(b)

(a)

(b)

(a)

(b)

VIBRATING UNIT

This is a Continuation of Application Ser. No. 08/087,478 filed on Jul. 2, 1993 now abandoned.

BACKGROUND OF THE INVENTION

1. Field of the Invention

The present invention relates to an energy trap type vibrating unit which is formed to be capable of preventing or inhibiting vibrational energy of a vibration source from leakage to the exterior.

2. Description of the Background Art

In relation to various apparatuses including vibration sources, generally required are (1) an apparatus which is so formed that vibration from the vibration source will not leak to the exterior, and (2) an apparatus which supports the vibration source without inhibiting its vibrating state.

An example of the apparatus (1) contains a structure which can serve as a vibration source, such as a motor or a compressor, for example. When vibration of such a motor or compressor contained in this apparatus is directly transferred to a chassis or a frame, a fixed portion of the chassis or frame is loosened, or large noise is spread to the surroundings. In such an apparatus containing a vibration source, therefore, vibration of the vibration source must be trapped in the apparatus. Or, it is strongly required that vibration of the vibration source is hardly transferred from the apparatus to another portion such as a floor face in a portion where the apparatus containing the vibration source is installed.

Other examples of the aforementioned apparatus (1) are an analog recorder player and an elevated railway. In an analog record player, it is strongly required that vibration caused by sounds which are generated from a speaker is not transferred to the player. When the speaker serves as a vibration source, therefore, an apparatus which can cut off such vibration is preferably interposed between the speaker and the player, in order to prevent howling. In an elevated railway, on the other hand, vibration is caused following passage of a car, to scatter low-frequency noise to the surroundings. Also in such an elevated railway, it is preferable to prevent the vibration which is caused following passage of the car from transfer to the ground.

On the other hand, an example of the apparatus (2) has a portion which is allowed to positively vibrate at a certain frequency, such as a tuning fork or a piezo-resonator. In such an apparatus, required is a structure for holding the tuning fork or the resonator, serving as a vibration source, without inhibiting the same from vibration. In other words, strongly required is a structure for mechanically holding the aforementioned vibration source without inhibiting the same from vibration.

In the aforementioned apparatus (1), a vibration control structure employing a spring member such as a coil spring or an elastic material such as rubber is generally used as means for inhibiting vibration of the vibration source from transfer to another portion. However, it is impossible to sufficiently cut off the vibration of the vibration source, and hence awaited is a structure which can further effectively prevent transfer of the vibration from the vibration source to another portion.

Also in the apparatus (2), a holding structure using a cushioning material such as a spring is employed in general. However, it is extremely difficult to reliably hold the vibration source such as a resonator or a tuning fork without inhibiting the same from vibration, while the holding structure is complicated.

In general, a piezo-resonator in a kHz band is prepared from (1) a resonator utilizing an expansion vibration mode of a rectangular piezoelectric plate, (2) a resonator utilizing a longitudinal vibration mode for stretching along the longitudinal direction of a bar type piezoelectric member, or (3) a piezoelectric tuning fork resonator.

A piezo-resonator vibrates when a voltage is applied to its resonant part. In order to form such a piezo-resonator as a practical component, therefore, it is necessary to support the piezo-resonator not to inhibit the resonant part from resonance. An energy trap type piezo-resonator can be mechanically supported in a region other than its resonant part, since vibrational energy is trapped in the resonant part. Considering application to a product, therefore, such an energy trap type piezo-resonator is easier to utilize. Thus, the energy-trap type piezo-resonator is desirable for a piezo-resonator in a kHz band.

In the aforementioned well-known resonator (1) utilizing an expansion vibration mode or the resonator (2) utilizing a longitudinal vibration mode, however, it is extremely difficult to trap vibrational energy. In a piezo-resonator 201 utilizing a longitudinal vibration mode shown in FIG. 1A, therefore, spring terminals 202 and 203 are adapted to hold a node of vibration, thereby holding the piezo-resonator 201. Also in a rectangular plate type piezo-resonator utilizing an expansion vibration mode, which is incapable of trapping vibrational energy, spring terminals are adapted to hold a node of the resonator. Thus, it is extremely difficult to form a piezo-resonator utilizing an expansion vibration mode or a longitudinal vibration mode in a kHz band as a surface-mountable miniature chip-type component, due to complicated structures of the elements.

In a piezoelectric tuning fork resonator 206 comprising a piezoelectric plate 204 which is polarized along the direction of thickness, slits 204a to 204c which are formed in the piezoelectric plate 204 and vibrating electrodes 205a (that provided on the rear surface is not shown) which are formed on both major surfaces around the central slit 204b as shown in FIG. 1B, on the other hand, energy is trapped in a vibrating portion. Therefore, this resonator 206 can be formed as a surface-mountable chip-type component since no fluctuation is caused in its characteristics even if the same is held in portions close to edges 204d and 204e of the piezoelectric plate 204.

However, the piezoelectric tuning fork resonator 206 can merely ensure a bandwidth in a range of only about 2% of the resonance frequency due to restriction in mode, although the same can trap energy. Thus, the piezoelectric tuning fork resonator 206 cannot satisfy strong requirement for a piezoelectric resonator ranging over a wide kHz band, which is awaited in the market.

SUMMARY OF THE INVENTION

Accordingly, a principal object of the present invention is to provide an energy trap type vibrating unit which can prevent or inhibit vibration of a vibration source from leakage to the exterior regardless of the type of the vibration source.

Another object of the present invention is to provide an energy trap type piezo-resonator having a relatively simple structure, which can be effectively utilized in a kHz band for attaining characteristics in a wider band.

According to a wide aspect of the present invention, provided is a vibrating unit comprising a vibration source, a vibration transfer part having an end which is coupled to the vibration source, and vibration cancel means which is coupled to the vibration transfer part to receive vibration from the vibration source and resonate in a bending mode, thereby canceling the as-propagated vibration by a dynamic vibration absorbing phenomenon.

The action of the vibration cancel means canceling the as-propagated vibration is conceivably caused by a well-known dynamic vibration absorbing phenomenon. Such a dynamic vibration absorbing phenomenon is described in "Vibration Technology" by Osamu Taniguchi, Corona Publishing Co. Ltd., Japan, pp. 113 to 116 in detail, for example. Briefly stated, the dynamic vibration absorbing phenomenon is such a phenomenon that a main vibrator, which must be prevented from vibration, is inhibited from vibration by a subvibrator when the subvibrator is coupled to the main vibrator with a properly selected natural frequency. The vibration cancel means according to the present invention corresponds to the subvibrator in the dynamic vibration absorbing phenomenon, whereby the vibration which is transferred from the vibration source through the vibration transfer part is canceled by the vibration cancel means on the basis of the dynamic vibration absorbing phenomenon. Accordingly, as used herein, "resonant part" refers to a dynamic damper that vibrates at a selected natural frequency.

Although the aforementioned literature "Vibration Technology" by Osamu Taniguchi, pp. 113 to 116 (Corona Publishing Co. Ltd., Japan) describes a theory of the aforementioned dynamic vibration absorbing phenomenon, there is no disclosure about the type of the vibrator for forming the subvibrator in practice.

According to the present invention, the vibration cancel means is so formed as to resonate in a bending mode as described above, whereby the vibration transferred from the vibration source is canceled on the basis of the aforementioned dynamic vibration absorbing phenomenon in a relatively simple structure.

According to the present invention, therefore, it is possible to prevent noise or vibration from diffusion to the surroundings in an apparatus containing a vibration source such as a motor or a compressor, or to reduce low-frequency noise in an elevated railway. In an apparatus such as a drill which disadvantageously applies vibration to an operator, it is possible to prevent a trouble or an accident by interposing the aforementioned vibration cancel means between a portion grasped by the operator and a vibrating portion.

According to a specific aspect of the present invention, provided is a piezo-resonator comprising a piezo-resonance unit serving as the aforementioned vibration source, a vibration transfer part having an end which is coupled to the piezo-resonance unit, and a resonant part which is coupled to the vibration transfer part for receiving vibration of the piezo-resonance unit to resonate, thereby canceling the as-propagated vibration by a dynamic vibration absorbing phenomenon. This piezo-resonator corresponds to a component which is obtained by applying the vibrating unit provided according to the aforementioned wide aspect of the present invention to a piezo-resonator.

According to the inventive piezo-resonator, the resonant part for resonating in a bending mode is so formed as to resonate by vibration which is propagated through the vibration transfer part. Similarly to the aforementioned vibrating unit, therefore, the as-propagated vibration is canceled by a dynamic vibration absorbing phenomenon, so that this vibration is hardly transferred to a portion beyond the resonant part.

When the piezo-resonance unit is formed in a proper structure such as that of a piezo-resonance unit utilizing a longitudinal vibration mode or that of a piezo-resonance unit utilizing an expansion vibration mode of a rectangular plate, therefore, it is possible to implement an energy trap type piezo-resonator ranging over a wide band, which can be applied to a kHz band. In the aforementioned piezo-resonator according to the present invention, therefore, the resonant part is formed by a vibrator which resonates in a bending mode, whereby it is possible to trap vibrational energy in a relatively simple structure by the aforementioned dynamic vibration absorbing phenomenon.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

As used herein, resonant part refers to a dynamic damper that vibrates at a selected natural frequency, as discussed at page 6, lines 4 to 19, supra.

Embodiments of the present invention are now described with reference to the drawings, for clarifying the present invention.

Figure 1A:
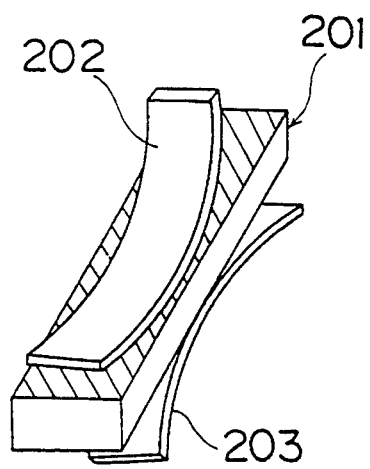
FIGS. 1A and 1B are a perspective view and a plan view for illustrating a conventional piezo-resonator utilizing a longitudinal vibration mode and a conventional piezoelectric tuning fork resonator respectively.
Figure 1B:
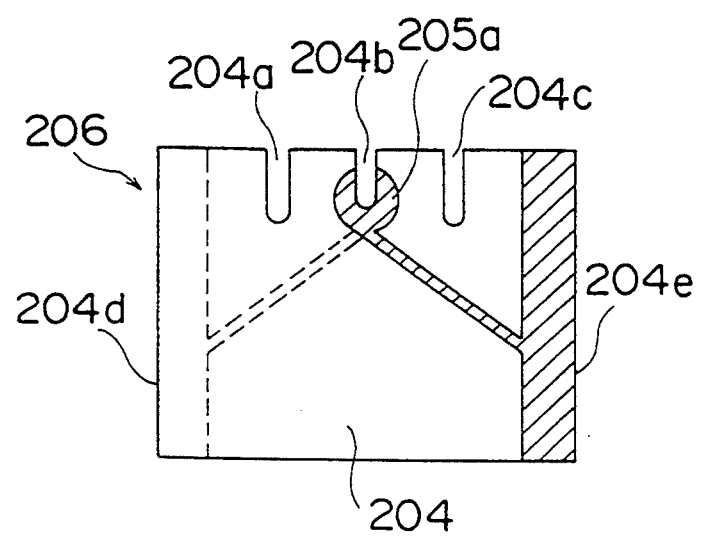
Figure 2:
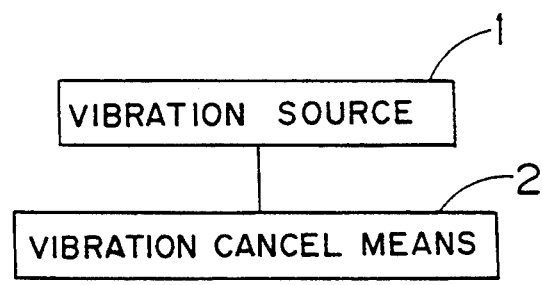
FIG. 2 is a schematic block diagram for illustrating the principle of the present invention.

With reference to FIG. 2, the principle of the present invention is now described. FIG. 2 is a schematic block diagram showing an energy trap type vibrating unit according to the present invention.

A vibration source 1 is formed by a proper member, such as a motor, a compressor, a piezo-resonator or a tuning fork, for example, which generates vibration. Vibration cancel means 2 is arranged to be capable of receiving the vibration generated in the vibration source 1. The vibration cancel means 2, which is adapted to cancel the vibration as propagated thereto, is formed by a resonant part which resonates in a bending vibration mode by the as-propagated vibration. While a concrete structure of this vibration cancel means 2 is properly set in response to the vibration propagated from the vibration source 1, its resonance frequency may be changed by selecting dimensions, mass etc. of the resonant part when the vibration cancel means 2 is formed by such a resonant part.

In the energy trap type vibrating unit according to the present invention, the propagated vibration is canceled by the vibration cancel means 2, whereby the vibration is prevented or inhibited from leakage to the exterior of the unit.

The aforementioned phenomenon of canceling the leaking part of the vibration by the resonance of the resonant part is now described with reference to FIGS. 3 to 5.

Figure 3:
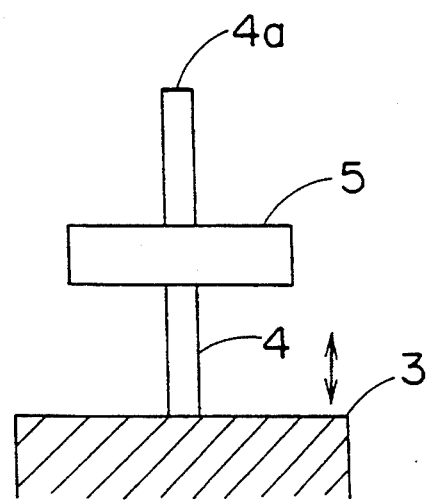
FIG. 3 is a front sectional view showing a testing device for illustrating the principle of the present invention.

FIG. 3 is a front sectional view showing a testing device for clarifying the principle of the present invention. Referring to FIG. 3, a support rod 4 is uprightly provided on an upper surface of a vibration testing device 3. A steel bar 5 which can vibrate in a bending mode is fixed to a vertical intermediate position of the support rod 4. The steel bar 5 is a bar-type member, which is made of steel, of 180 mm in length, 12 mm in width and 15 mm in thickness, having weight of 240 g and a resonance frequency of about 1 kHz in bending. On the other hand, the support rod 4, which is a columnar member of steel having a diameter of 8 mm, is inserted in a through hole provided in a center of the steel bar 5. The steel bar 5 and the support rod 4 are fixed to each other in the state shown in FIG. 3. Thus, the vibration testing device 3 corresponds to a piezo-resonance unit according to the present invention and the steel bar 5 corresponds to a resonant part, while a portion of the support rod 4 downward beyond the steel bar 5 corresponds to a vibration transfer part.

Figure 4A:
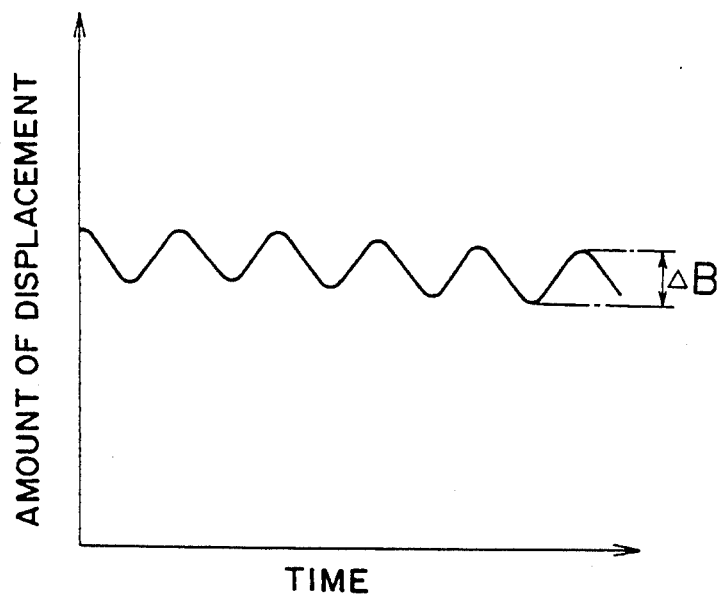
FIG. 4A illustrates relation between displacement and time in the testing device shown in FIG. 3.

When the vibration testing device 3 was allowed to vertically vibrate at a frequency of 1 kHz as shown by arrow in FIG. 3, the steel bar 5 resonated in a bending mode, whereby an upper end 4a of the support rod 4 was displaced as shown in FIG. 4A. Referring to FIG. 4A, the amount $\Delta B$ of displacement was about 2.6 $\mu$m. For the purpose of comparison, a support rod 4 was uprightly provided on a similar vibration testing device 3 with no steel bar 5, and the vibration testing device 3 was allowed to vibrate in a similar manner to the above. In this case, an upper end 4a of the support rod 4 was transversely displaced by such bending mode vibration as shown in FIG. 4B, with an amount $\Delta B$ of displacement of about 22.6 $\mu$m.

Figure 4B:
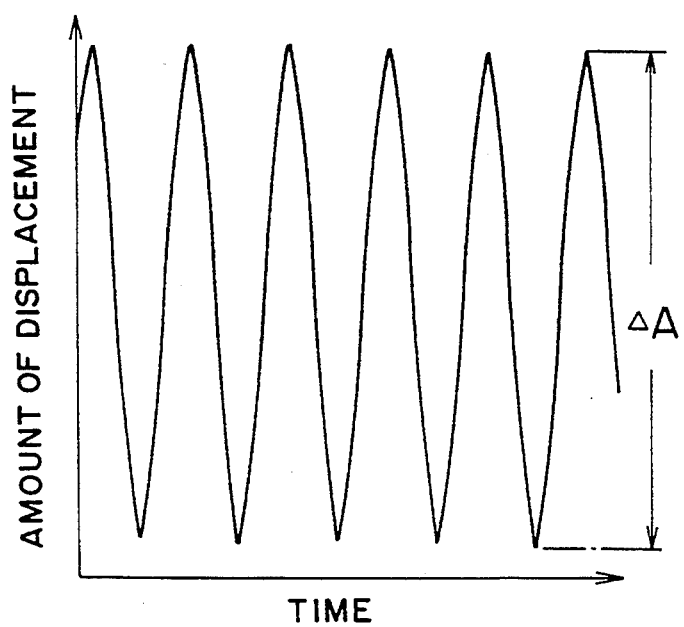
FIG. 4B illustrates relation between displacement and time in a testing device provided with no resonator.

Comparing FIGS. 4A and 4B with each other, it is understood that the vibration which was transferred from the vibration testing device 3 through the support rod 4 was sufficiently damped by the steel bar 5.

On the assumption that the vibration was damped by the mass of the steel bar 5, the inventors made another experiment by changing the frequency of the vibration with no resonance of the steel bar 5. As the result, it was confirmed that the amount of displacement on the upper end 4a of the support rod 4 was not suppressed as shown in FIG. 4A. Thus, it is conceivable that the as-propagated vibration was not merely damped by the weight of the steel bar 5, but this vibration was canceled by the aforementioned dynamic vibration absorbing phenomenon.

Description is now made on examples further effectively utilizing the principle of the present invention with reference to FIGS. 5A to 8.

Figure 5A:
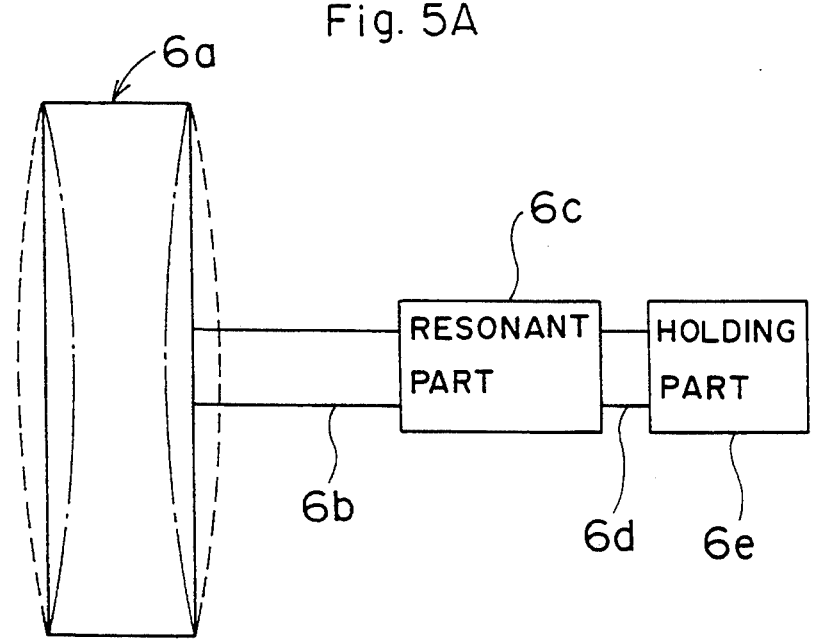
FIG. 5A is a schematic block diagram for illustrating an applied example of the present invention.

Referring to FIG. 5A, it is assumed that a vibration source 6a vibrates to repeat states shown by one-dot chain lines and broken lines in this figure. When a vibration transfer part 6b is coupled to a portion of the vibration source 6a exhibiting the maximum displacement and a resonant part 6c capable of resonating in a bending mode is coupled to the other end of the vibration transfer part 6b, it is possible to cancel vibration which is propagated from the vibration source 6a in the resonant part 6c, thereby preventing the vibration from leakage to a holding part 6e which is coupled to the resonant part 6c through a coupling bar 6d. In this example, the vibration transfer part 6b is coupled to the portion of the vibration source 6a exhibiting the maximum displacement to suppress vibration of the vibration source 6a by such coupling, whereby it is possible to further effectively prevent the vibration from transfer to the holding part 6e. When the holding part 6e is fixed to another portion of this unit or a floor face, therefore, it is possible to effective prevent the vibration from leakage to this portion of the unit or the floor face.

Figure 5B:
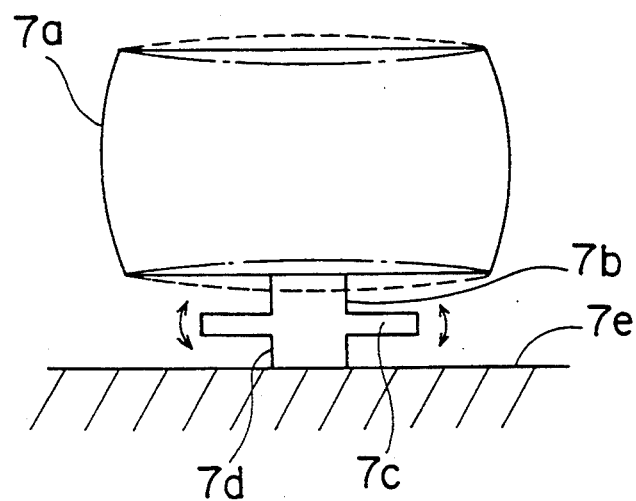
FIG. 5B is a front sectional view showing a vibrating unit according to a first embodiment of the present invention.

FIG. 5B is a typical front sectional view showing a structure further embodying the example shown in FIG. 5A. Referring to FIG. 5B, a pump 7a serving as a vibration source is coupled to a resonant plate 7c for forming a resonant part through a coupling bar 7b serving as a vibration transfer part. Another coupling bar 7d is coupled to a lower end of the resonant plate 7c, and this coupling bar 7d is fixed onto a floor face 7e. The resonant plate 7c extends perpendicularly to the plane of FIG. 5B, and is formed to be capable of receiving vibration propagated from the pump 7a to vibrate in a bending mode as shown by arrows in FIG. 5b. The coupling bar 7b is coupled to a portion of the pump 7a exhibiting the maximum displacement. In the structure shown in FIG. 5B, the vibration as propagated is thus canceled by the resonant plate 7c while the coupling bar 7b is coupled to the portion of the pump 7a exhibiting the maximum displacement, whereby the vibration of the pump 7a is hardly transferred to the floor face 7e. Thus, it is possible to reduce noise following driving of the pump 7a.

As hereinabove described, it is understood that vibrational energy is trapped in a portion up to the resonant plate 7c serving as vibration cancel means according to the present invention. Therefore, when the aforementioned resonant part is arranged in a drill between a portion serving as a vibration source such as a motor and a portion grasped by an operator, for example, it is possible to prevent vibration from propagation to the operator's hand, thereby protecting the operator against a trouble caused by propagation of mechanical vibration.

Depending on the unit, on the other hand, it may be necessary to physically support the vibration source without inhibiting the same from vibration. In this case, the vibration cancel means may be coupled to a portion of the vibration source exhibiting the minimum displacement. For example, it is assumed that a vibration source 8a vibrates to be capable of taking states shown by solid lines and one-dot chain lines in FIG. 6A. In this case, a vibration transfer part 8c may be coupled to a portion 8b of the vibration source 8a exhibiting the minimum displacement, and a resonant part 8d serving as vibration cancel means may be coupled to the other end of the vibration transfer part 8c. Since the vibration transfer part 8c is thus coupled to the portion 8b exhibiting the minimum displacement, the vibration source 8a is not much inhibited from vibration. Further, the vibration propagated through the vibration transfer part 8c is canceled by the resonant part 8d, to be trapped within the unit. Thus, the vibration source 8a is not inhibited from vibration but can be allowed to vibrate in a state inhibited from leakage of the vibration to the exterior.

Figure 6A:
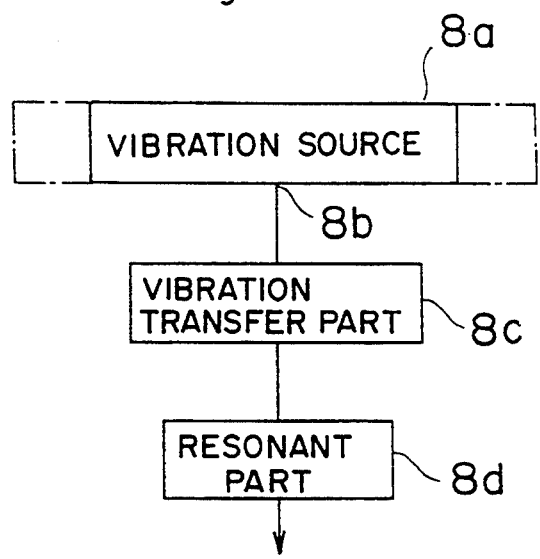
FIG. 6A is a schematic block diagram showing another applied example of the present invention.
Figure 6B:
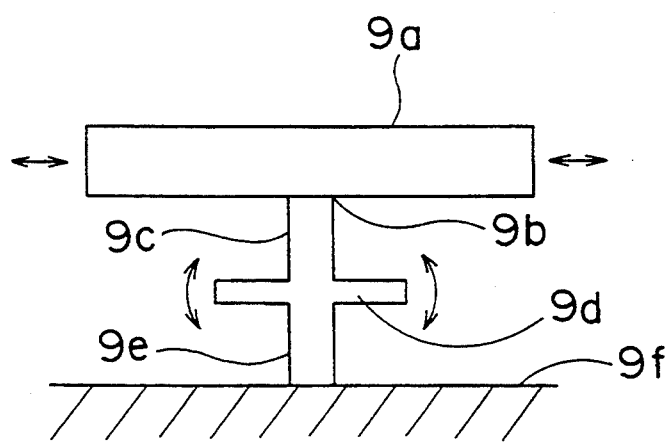
FIG. 6B is a front sectional view showing an exemplary structure embodying the applied example shown in FIG. 6A.
Figure 7:
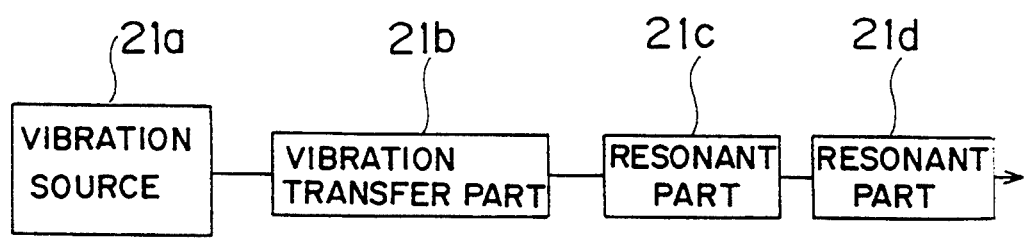
FIGS. 7(a) and 7(b) are schematic block diagrams showing modifications of the first embodiment of the present invention respectively.
Figure 7:
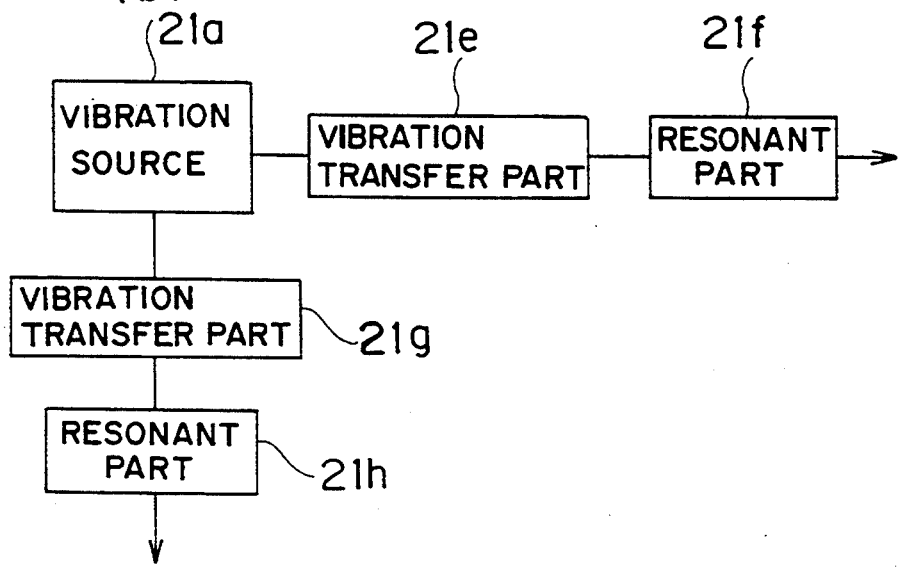

FIG. 6B is a front sectional view showing a further concrete structure embodying the example shown in FIG. 6A. It is assumed here that a vibration source 9a stretchingly vibrates along arrows shown in the figure, i.e., along its longitudinal direction. A coupling bar 9c serving as a vibration transfer part is coupled to a portion 9b on a lower surface of the vibration source 9a exhibiting the minimum displacement. A resonant plate 9d extending perpendicularly to the plane of the figure is integrally formed on the other end of the coupling bar 9c.

The resonant plate 9d is so formed as to receive vibration propagated through the coupling bar 9c and vibrate in a bending mode along arrows in the figure. Thus, the vibration as propagated is canceled by resonance of the resonant plate 9d. When the coupling bar 9e which is coupled to the lower surface of the resonant plate 9d is coupled to a floor face 9f, therefore, it is possible to prevent leakage of vibration to the floor face 9f without inhibiting the vibration source 9a from vibration, due to such mechanical supporting.

While the resonant parts 6c and 8d and the resonant plates 7c and 9d serving as vibration cancel means are adapted to cancel vibration from the vibration sources in the aforementioned examples, such a resonant part or resonator preferably has a resonance frequency which is in agreement with or approximate to the frequency of the vibration propagated from the vibration source, so that the as-propagated vibration can be more effectively canceled.

Further, while the vibration from the vibration source is canceled by the resonant part or the resonant plate to prevent or inhibit the vibration from leakage to another portion in each of the aforementioned examples, it is possible to cancel only a vibration component of a specific frequency or a specific vibration mode among as-propagated vibration components of various modes by selecting the resonance frequency of the resonant part or a resonator, to selectively allow leakage of the vibration components of other vibration modes or frequencies. Therefore, the invention described in claims 1 and 2 can be applied to a unit such as an acoustic filter which can cut off only vibration of a specific vibration mode or a specific frequency.

Further, it is not necessarily required to couple the resonant part or the resonant plate serving as vibration cancel means to the vibration source through the aforementioned solid vibration transfer part. Alternatively, the vibration transfer part may be prepared from a gas such as air or a liquid such as water, so far as the resonant part or the resonator can receive vibration through the same.

FIGS. 7(a) and 7(b) are schematic block diagrams typically illustrating principles of energy trap type vibrating units according to modifications of the first embodiment of the present invention.

Referring to FIG. 7(a), a vibration source 21a is formed by a proper member, such as a motor, a compressor, a piezo-resonator or a tuning fork, for example, generating vibration. A vibration transfer part 21b is coupled to this vibration source 21a. The vibration transfer part 21b, which may simply be formed to be capable of receiving vibration generated in the generation source 21a, is appropriately provided in the form of a bar or a plate. In order to attain a higher damping effect, the vibration transfer part 21b is preferably made of a material, such as rubber, having a damping property itself. Alternatively, the vibration transfer part 21b may be made of a rigid material such as a metal.

A first resonant part 21c is coupled to the other end of the vibration transfer part 21b. The first resonant part 21c is so formed as to receive vibration which is propagated from the vibration source 21a through the vibration transfer part 21b, and to resonate. Further, a second resonant part 21d is coupled to the other end of the first resonant part 21c. The second resonant part 21d is so formed as to receive vibration which is propagated through the vibration transfer part 21b and the first resonant part 21c, and to resonate.

The first and second resonant parts 21c and 21d are formed to be capable of resonating in a bending mode respectively, while resonance frequencies thereof differ from each other. The resonance frequencies of the first and second resonant parts 21c and 21d are so selected as to damp various vibration components. Namely, the resonant parts 21c and 21d act to cancel specific vibration components by a dynamic vibration absorbing phenomenon, in response to the resonance frequencies thereof. In general, the vibration source 21a generates coupling vibration which includes vibration components of various modes and frequencies. Thus, it is possible to further effectively damp such coupling vibration propagated from the vibration source 21a, by providing a plurality of resonant parts 21c and 21d resonating at different resonance frequencies.

The vibration source 21a may vibrate in extremely high vibration strength at a specific frequency. In this case, it is possible to effectively damp the specific vibration having high vibration strength by forming the resonant parts 21c and 21d so that the resonance frequencies thereof are in agreement with the specific frequency of this vibration.

While the first and second resonant parts 21c and 21d are coupled to the vibration source 21a through the single vibration transfer part 21b, such a plurality of resonant parts may be coupled to different vibration transfer parts. Namely, first and second resonant parts 21f and 21h may be coupled to a vibration source 21a through different vibration transfer parts 21e and 21g respectively, as shown in FIG. 7(b).

Figure 8:
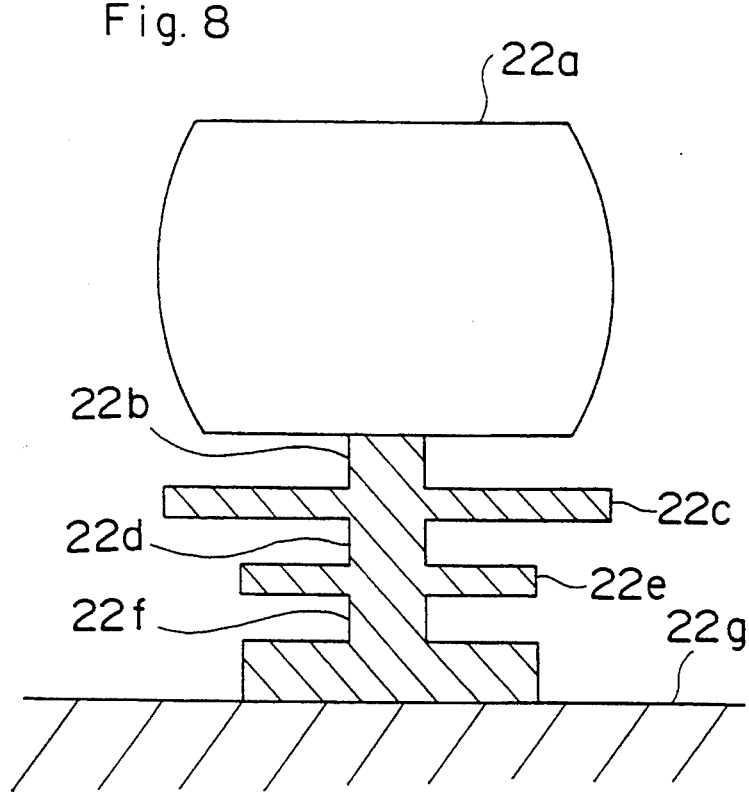
FIG. 8 is a front sectional view showing a vibrating unit embodying the modification shown in FIG. 7(a)

FIG. 8 is a front sectional view for illustrating an energy trap type vibrating unit embodying the modification shown in FIG. 7(a).

In this structure, a motor 22a is employed as a vibration source, and a support member 22b is coupled to a lower surface of this motor 22a to serve as a vibration transfer part. A resonant plate 22c defining a first resonant part is integrally formed on a lower end of the support member 22b. The resonant plate 22c, which extends perpendicularly to the plane of FIG. 8, is so formed as to receive vibration propagated through the support member 22b, and to resonate in a bending mode.

Further, a second support member 22d is coupled to a lower surface of the resonant plate 22c to serve as another vibration transfer part, while a second resonant plate 22e is coupled to a lower end of the second support member 22d. The second resonant plate 22e, which extends perpendicularly to the plane of FIG. 8, is formed to be different in size from the first resonant plate 22c. Thus, the second resonant plate 22e resonates in a bending vibration mode, at a frequency which is different from that of the first resonant plate 22c.

A third support member 22f is coupled to a lower surface of the second resonant plate 22e. A lower surface of the third support member 22f is fixed to a floor face 22g.

In the energy trap type vibrating unit having the aforementioned structure, vibration of the motor 22a is transferred to the first support member 22b, and the first resonant plate 22c resonates by vibration propagated through the first support member 22b. Further, the second resonant plate 22e resonates by vibration propagated through the first resonant plate 22c and the second support member 22d. The first and second resonant plates 22c and 22e, which are formed to be different in resonance frequency from each other, effectively cancel components of the vibration, being propagated from the motor 22a to the support member 22b, which are in agreement with the resonance frequencies of the first and second resonant plates 22c and 22e respectively by a dynamic vibration absorbing phenomenon.

When the vibration generated in the motor 22a serving as a vibration source includes vibration components having high strength values at two specific frequencies, therefore, it is possible to effectively prevent the motor 22a from leakage of the vibration to the floor surface 22g by forming the first and second resonant plates 22c and 22e with resonance frequencies which are in agreement with such specific frequencies.

Embodiment of Piezo-Resonator

Figure 9:
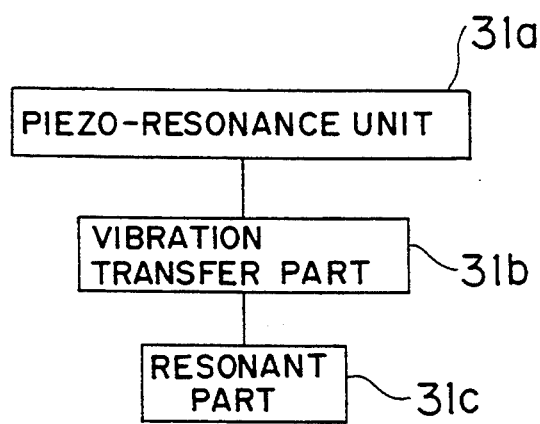
FIG. 9 is a schematic block diagram for illustrating the structure of a second embodiment according to the present invention.

FIG. 9 is a schematic block diagram for illustrating a piezo-resonator according to a second embodiment of the present invention. In this piezo-resonator, a vibration transfer part 31b is coupled to a piezo-resonance unit 31a, while a resonant part 31c is coupled to the vibration transfer part 31b.

The piezo-resonance unit 31a is formed to be capable of being excited in a proper vibration mode such as a longitudinal vibration mode, a contour shear vibration mode, an expansion vibration mode or the like. On the other hand, the vibration transfer part 31b is adapted to transfer vibration which is propagated from the piezo-resonance unit 31a to the resonant part 31c. Therefore, the structure of the vibration transfer part 31b itself is not particularly restricted so far as the same can support the piezo-resonance unit 31a and transfer its vibration to the resonant part 31.

The resonant part 31c is so formed as to receive vibration which is propagated through the vibration transfer part 31b, and to resonate. This resonant part 31c, which is formed to resonate in a bending mode, acts to cancel the as-propagated vibration by the aforementioned dynamic vibration absorbing phenomenon, as hereinafter described with reference to experimental example and Example.

Embodiment of Piezo-Resonator Utilizing Longitudinal Vibration Mode

Figure 10:
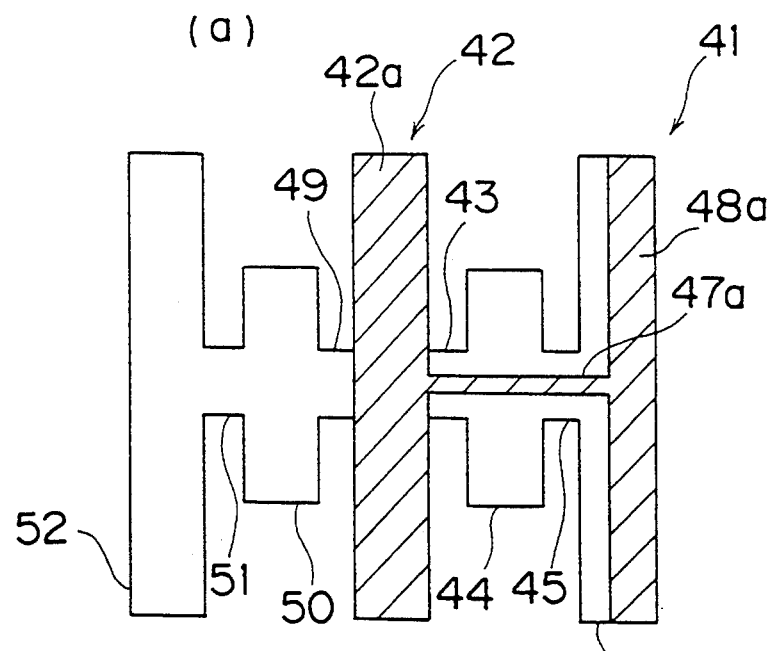
FIGS. 10(a) and 10(b) are a plan view of a piezo-resonator according to the second embodiment of the present invention and a typical plan view showing a shape of an electrode, provided on a lower surface, through a piezoelectric substrate respectively.
Figure 10:
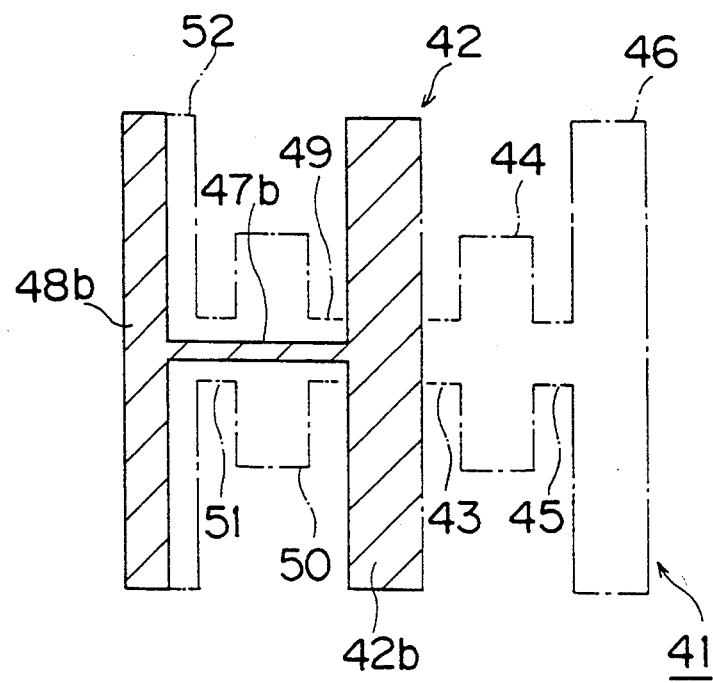

FIGS. 10(a) and 10(b) are plan views showing a piezo-resonator 41 according to a second embodiment of the present invention and a shape of an electrode provided on a lower surface through a piezoelectric substrate respectively. The piezo-resonator 41 has a piezo-resonance unit 42 which is arranged on a central portion. This piezo-resonance unit 42 is formed by a piezoelectric substrate, which is uniformly polarized in the direction of its thickness, having an elongated rectangular planar shape, and electrodes 42a and 42b formed on both major surfaces of the piezoelectric substrate. An alternating voltage is so applied through the electrodes 42a and 42b that the piezo-resonance unit 42 stretchingly vibrates in a longitudinal vibration mode.

A vibration transfer part 43 is coupled to one side of a longitudinal central portion of the piezo-resonance unit 42. This vibration transfer part 43 is adapted to transfer vibration following the stretching vibration of the piezo-resonance unit 42 to a resonant part 44 as described later. The vibration transfer part 43 is coupled to the longitudinal central portion of the piezo-resonance unit 42, not to inhibit the piezo-resonance unit 42 from vibration.

The other end of the vibration transfer part 43 is coupled with the resonant part 44, which is so formed as to receive vibration of the piezo-resonance unit 42 and to resonate at a frequency which is substantially identical to the resonance frequency of the piezo-resonance unit 42 in a bending mode. The other end of the vibration transfer part 43, being coupled with the resonant part 44, is a portion other than a node of the vibration transfer part 43. Further, a holding part 46 having a relatively large area is coupled to the resonant part 44 through a coupling bar 45. This holding part 46 is provided in the relatively large area as shown in the figures, to be suitable for mechanically holding the piezo-resonator 41 on another member such as a case substrate.

The electrode 42a is electrically connected to a terminal electrode 48a, which is formed on an upper surface of the holding part 46, by a connecting conductive part 47a.

A vibration transfer part 49, a resonant part 50, a coupling bar 51 and a holding part 52 are also coupled to the piezo-resonance unit 42 on a side opposite to that coupled with the vibration transfer part 43. As shown in FIG. 10(b), a connecting conductive part 47b and a terminal electrodes 48b which are electrically connected to the electrode 42b are formed on lower sides of the vibration transfer part 49, the resonant part 50, the coupling bar 51 and the holding part 52 respectively.

In the piezo-resonator 41 of this embodiment, an alternating voltage is applied across the terminal electrodes 48a and 48b, so that the piezo-resonance unit 42 stretchingly vibrates in a longitudinal vibration mode. Consequently, this vibration is transferred to the resonant parts 44 and 50 through the vibration transfer parts 43 and 49. The resonant parts 44 and 50 serve as subvibrators in the aforementioned dynamic vibration absorbing phenomenon, whereby the vibration hardly leaks toward the coupling bars 45 and 51. Therefore, vibrational energy is trapped in portions up to the resonant parts 44 and 50, whereby it is possible to implement the piezo-resonator 41 of an energy trap type utilizing a longitudinal vibration mode by mechanically coupling the same to the exterior through the holding parts 46 and 52.

Action of the resonant part 44 is now described on the basis of a result of a concrete experiment.

Figure 11:
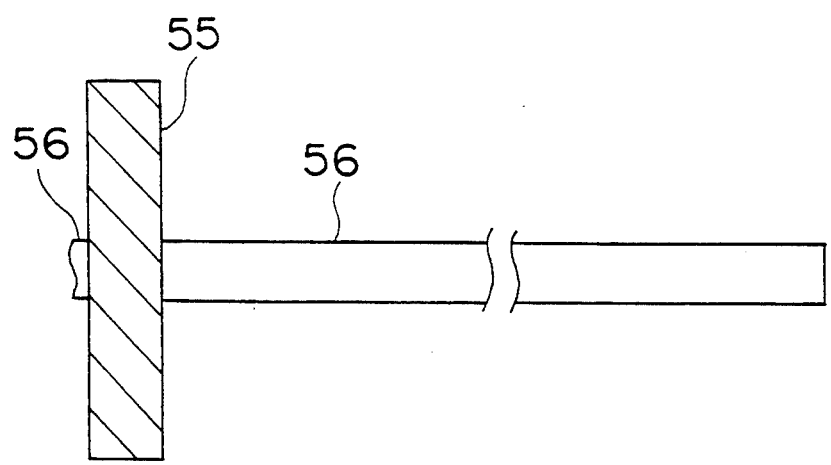
FIG. 11 is a partially fragmented plan view showing a structure of a piezo-resonance unit utilizing a longitudinal vibration mode, which is coupled with a bar.

FIG. 11 illustrates a structure, prepared for the purpose of comparison, comprising a piezo-resonance unit 55 which is formed to be capable of vibrating in a longitudinal vibration mode and a bar 56 which is coupled to a central portion of one side surface of the piezo-resonance unit 55 to extend in a direction perpendicular to the piezo-resonance unit 55. Another bar 56 is also coupled to a central portion of another side surface of the piezo-resonance unit 55.

Figure 12:
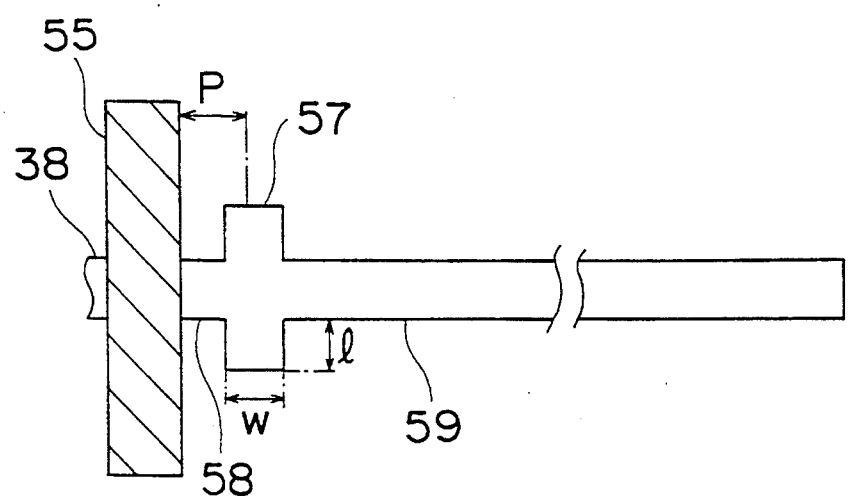
FIG. 12 is a partially fragmented plan view showing a structure of another piezo-resonance unit utilizing a longitudinal vibration mode, which is coupled with a resonant part.

FIG. 12 shows a structure, which is similar to that shown in FIG. 11, provided with a resonant part 57. In the structure shown in FIG. 12, the resonant part 57 is coupled to a piezo-resonance unit 55 through a vibration transfer part 58, while a bar 59 is coupled to a surface of the resonant part 57 which is opposite to that coupled with the vibration transfer part 58. In other words, the resonant part 57 is formed in an intermediate position of a portion formed by the vibration transfer part 58 and the bar 59. In the structure shown in FIG. 12, components similar to the above are also coupled to the other side surface of the piezo-resonance unit 55.

Figure 13:
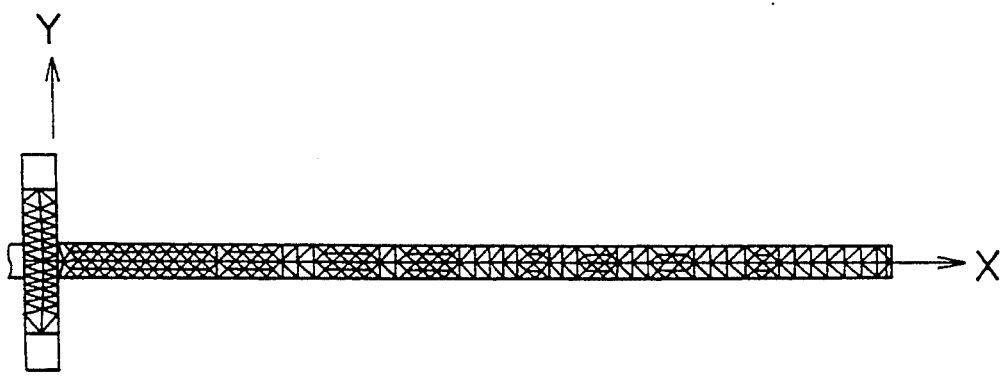
FIGS. 13(a) and 13(b) illustrate displacement distribution in the structure shown in FIG. 11 and absolute values of amounts of displacement in respective portions along an X-axis direction respectively.
Figure 13:
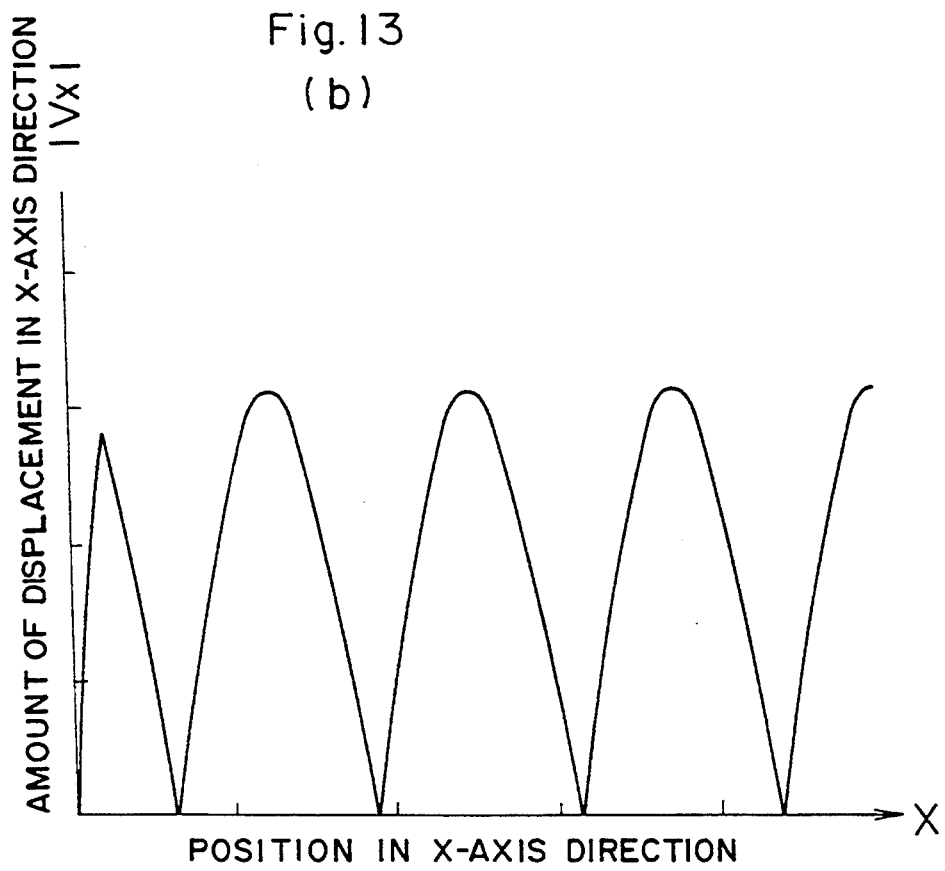

FIG. 13($a$) shows displacement distribution in the piezo-resonator shown in FIG. 11, which was caused when the piezo-resonance unit 55 is allowed to vibrate in a longitudinal vibration mode, and FIG. 13($b$) shows absolute values $V_X$ of amounts of displacement in an X-axis direction in the respective portions along the longitudinal direction the bar 56, i.e., on the X-axis.

Figure 14:
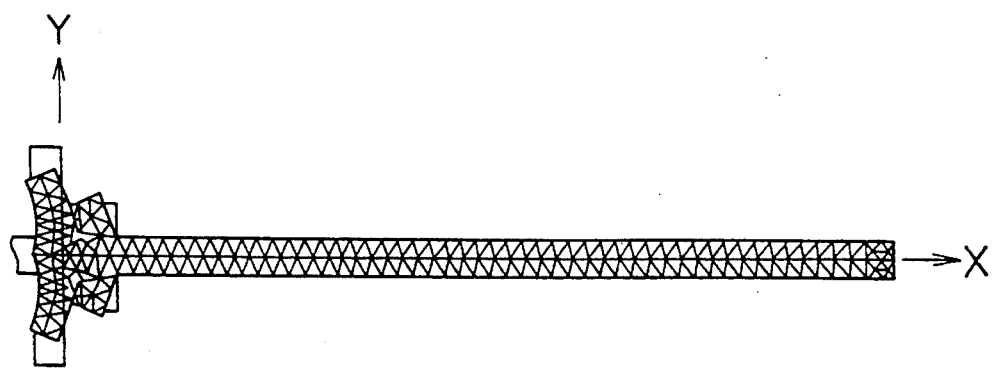
FIG. 14 illustrates displacement distribution in the structure shown in FIG. 12.
Figure 15:
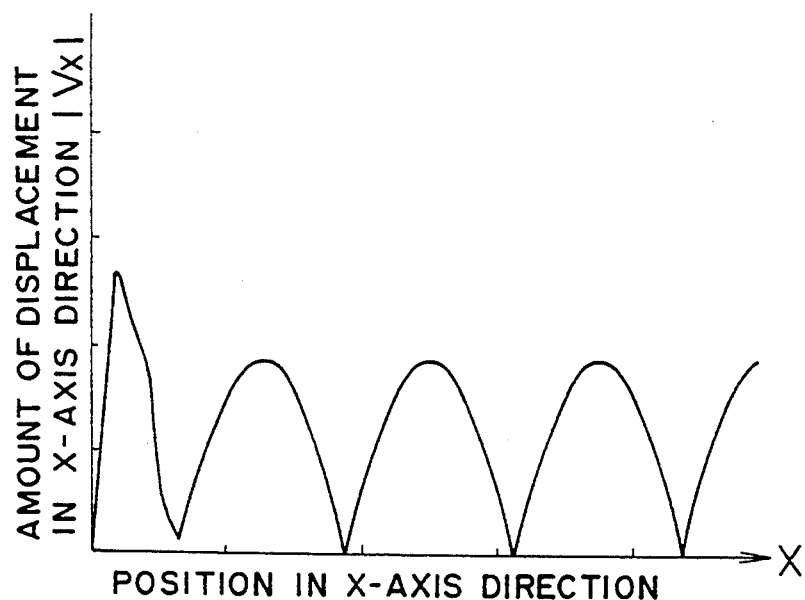
FIG. 15 illustrates absolute values of amounts of displacement in an X-axis direction in respective portions along the X-axis direction, which were measured when vibrational energy based on fundamental harmonic resonance of a piezo-resonance unit was transferred to a resonant part and the resonant part resonated in fundamental harmonic vibration of a bending mode.

On the other hand, FIG. 14 shows displacement distribution which was caused when the piezo-resonance unit 55 was allowed to resonate in the piezo-resonator shown in FIG. 12. Further, FIG. 15 shows absolute values $V_X$ of amounts of displacement in an X-axis direction in the respective portions on the X-axis.

Comparing FIGS. 13($b$) and 15 with each other, it is clearly understood that the amounts of displacement caused by propagated vibration were extremely reduced in the portion of the bar 59 located beyond the resonant part 57, due to the provision of the resonant part 57. In other words, it is understood that vibrational energy can be effectively trapped in a portion up to the resonant part 57.

Description is now made on the fact that vibrational energy can be effectively trapped in a portion up to a resonant part when the resonance frequency of the resonant part is substantially identical to that of a piezo-resonance unit, with reference to FIGS. 15 to 28.

As hereinabove described, the structure shown in FIG. 12 exhibits displacement distribution shown in FIG. 14 when the piezo-resonance unit 55 is allowed to vibrate. Such displacement distribution shown in FIG. 14 is attained when the piezo-resonance unit 55 and the resonant part 57 resonate in fundamental harmonic vibration respectively.

FIGS. 15 to 20 illustrate absolute values of amounts of displacement in X-axis directions in respective portions along the X-axis directions in piezo-resonators provided with piezo-resonance units 55 of 0.6 mm in width, 4.0 mm in length and 0.4 mm in thickness having resonance frequencies of 422 kHz with changes of widths W and lengths l (see FIG. 12) of resonant parts 57.

Figure 16:
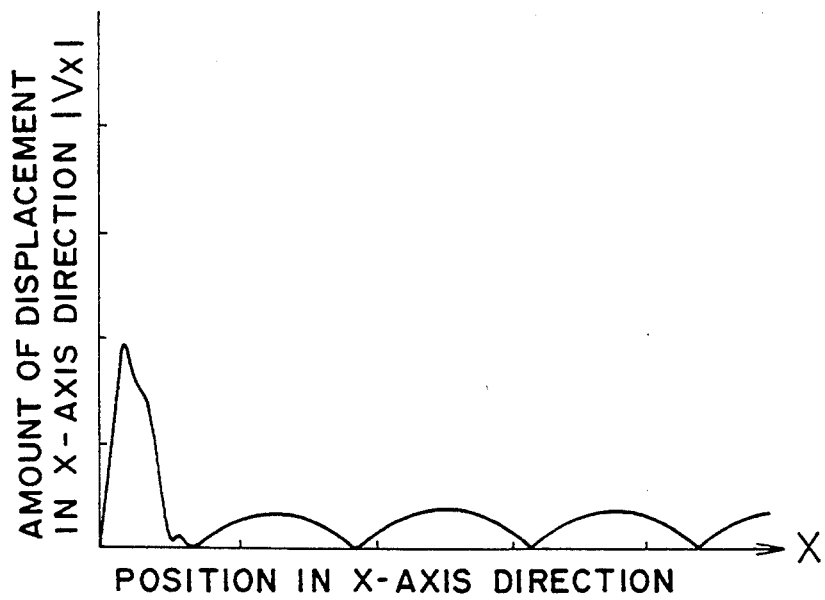
FIG. 16 illustrates absolute values of amounts of displacement in an X-axis direction in respective portions along the X-axis direction, which were measured when a piezo-resonance unit and a resonant part resonated at fundamental harmonic resonance frequencies being in agreement with each other.
Figure 17:
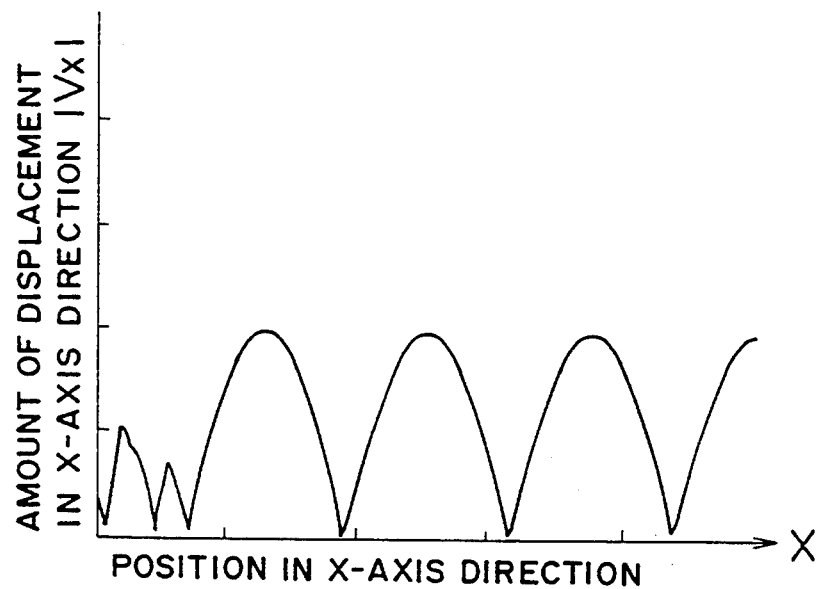
FIG. 17 illustrates absolute values of amounts of displacement in an X-axis direction in respective portions along the X-axis direction, which were measured when a piezo-resonance unit and a resonant part resonated in fundamental harmonic vibration.
Figure 18:
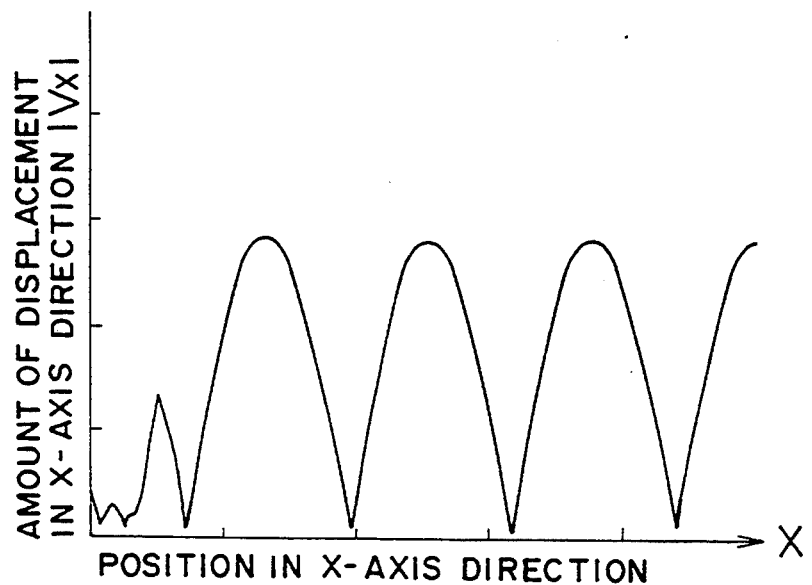
FIG. 18 illustrates absolute values of amounts of displacement in an X-axis direction in respective portions along the X-axis direction, which were measured when a piezo-resonance unit and a resonant part resonated in fundamental harmonic vibration.
Figure 19:
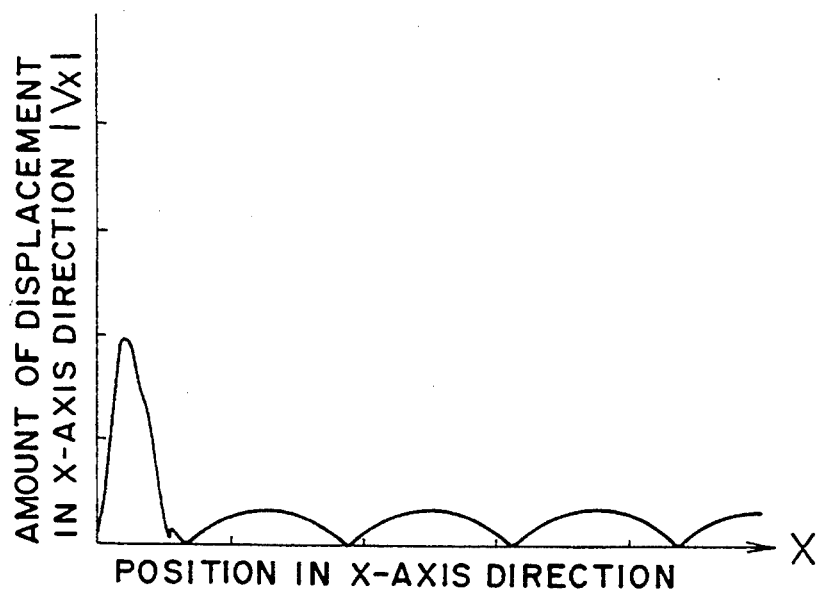
FIG. 19 illustrates absolute values of amounts of displacement in an X-axis direction in respective portions along the X-axis direction, which were measured when a piezo-resonance unit and a resonant part resonated in fundamental harmonic vibration.
Figure 20:
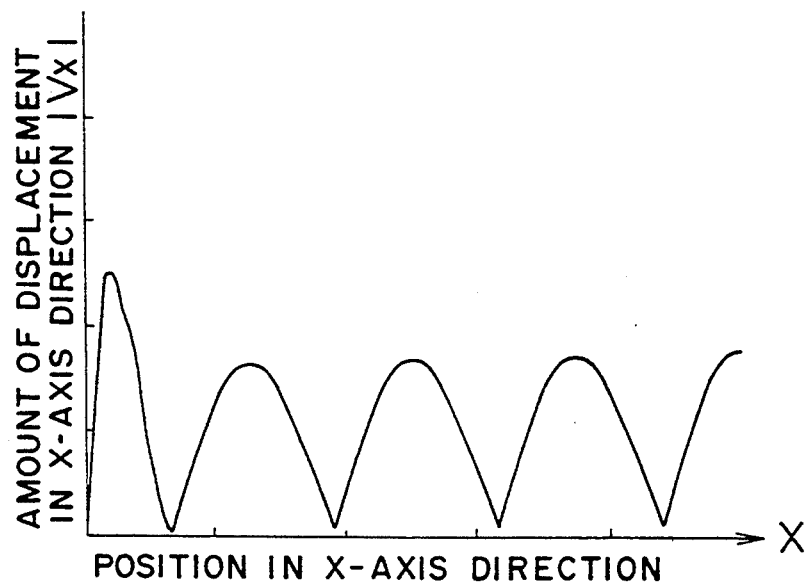
FIG. 20 illustrates absolute values of amounts of displacement in an X-axis direction in respective portions along the X-axis direction, which were measured when a piezo-resonance unit and a resonant part resonated in fundamental harmonic vibration.

FIGS. 15 to 17 illustrate absolute values of amounts of displacement with resonant parts 57 having lengths l of 0.70 mm and widths W of 0.55 mm, 0.65 mm and 0.75 mm respectively, while FIGS. 18 to 20 illustrate those with resonant parts 57 having widths W of 0.65 mm and lengths l of 0.65 mm, 0.70 mm and 0.75 mm respectively. The lengths l and widths W of the resonant parts 57 were so varied as to change the resonance frequencies of the resonant parts 57.

Comparing the data shown in FIG. 15 to 20 with that shown in FIG. 13($b$), it is understood that propagated vibrational energy can be canceled by any of the resonant parts 57 having the aforementioned dimensions.

It is also understood that the propagated vibrational energy can be further effectively canceled by action of the resonant part 57 in each of the structures shown in FIGS. 16 and 19. This is conceivably because the propagated vibrational energy was effectively canceled by a dynamic vibration absorbing phenomenon since the resonance frequency of the resonant part 57 was substantially identical to that of the piezo-resonance unit 55.

Figure 21:
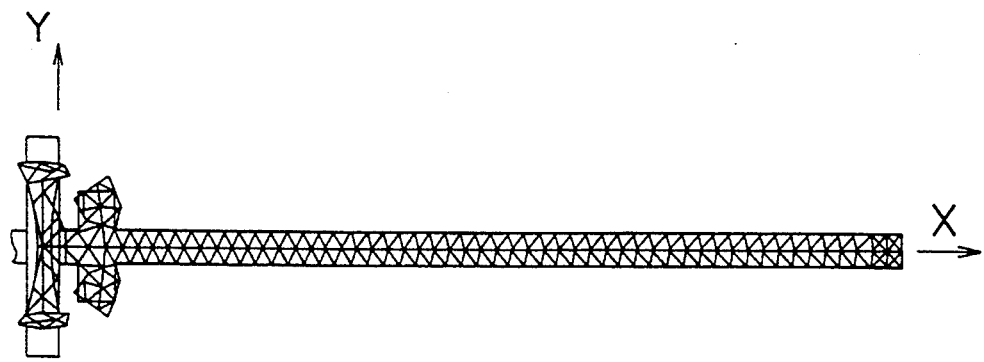
FIG. 21 illustrates displacement distribution caused when both of a piezo-resonance unit and a resonant part resonated in third harmonic vibration.
Figure 22:
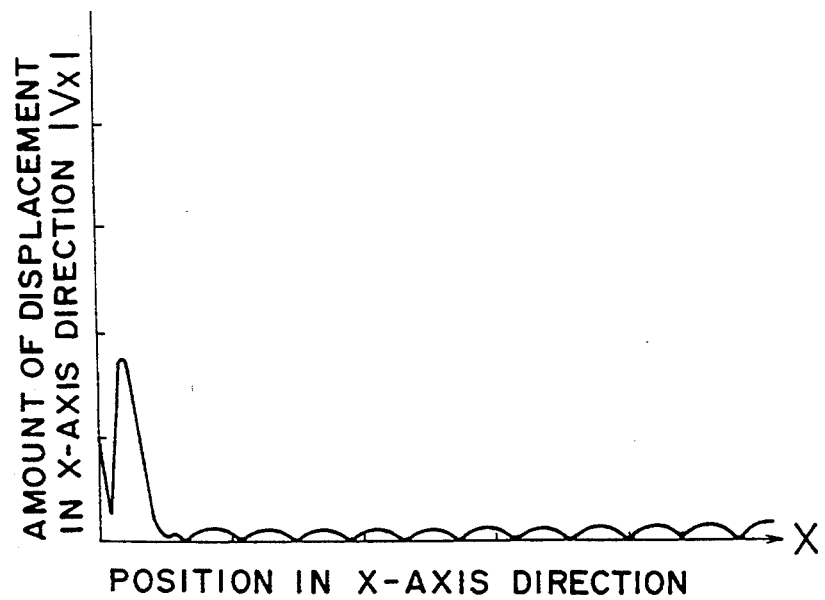
FIG. 22 illustrates absolute values of amounts of displacement along an X-axis direction in respective portions along the X-axis direction, which were measured when a piezo-resonance unit and a resonant part resonated in the manner shown in FIG. 21.
Figure 23:
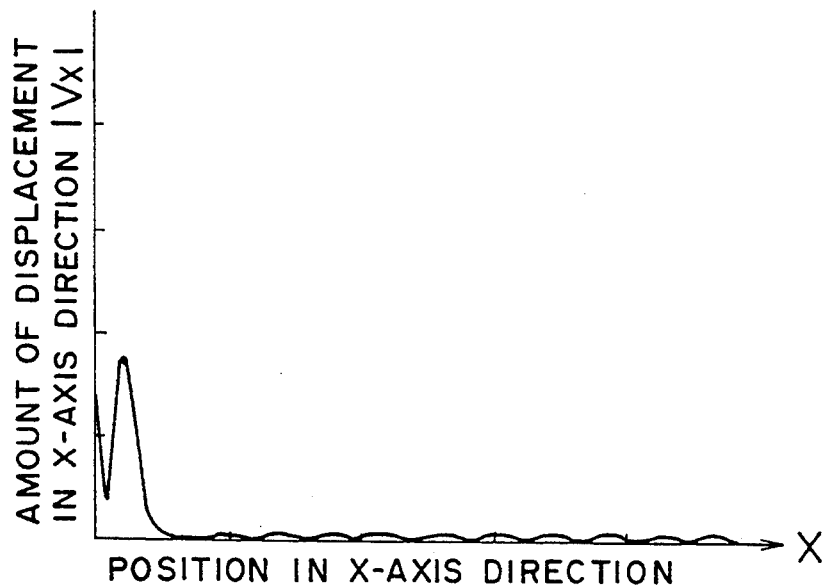
FIG. 23 illustrates absolute values of amounts of displacement along an X-axis direction in respective portions along the X-axis direction, which were measured when a piezo-resonance unit and a resonant part resonated in the manner shown in FIG. 21.
Figure 24:
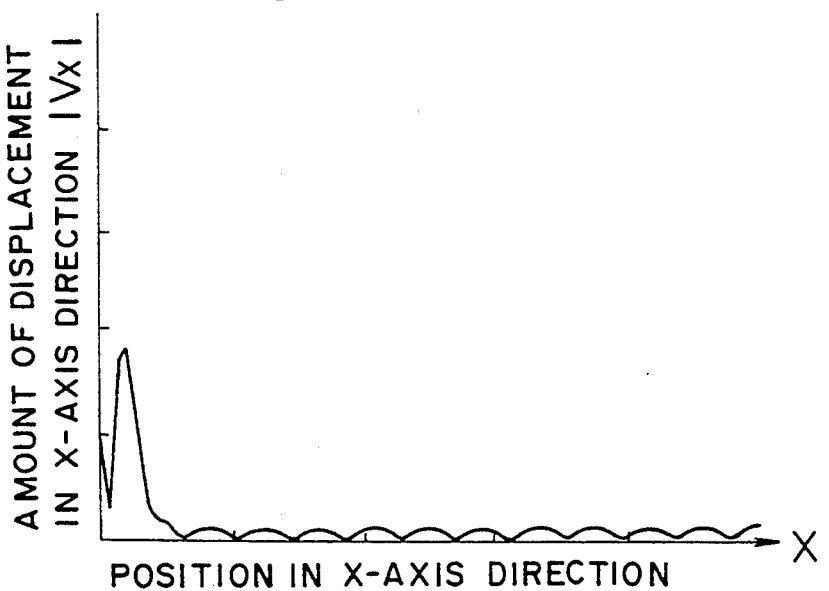
FIG. 24 illustrates absolute values of amounts of displacement along an X-axis direction in respective portions along the X-axis direction, which were measured when a piezo-resonance unit and a resonant part resonated in the manner shown in FIG. 21.

Description is now made on action of the resonant part 57 attained when the piezo-resonance unit 55 and the resonant part 57 resonate in third harmonic vibration in the structure shown in FIG. 12. FIG. 21 shows displacement distribution which was caused when the piezo-resonance unit 55 resonated in third harmonic vibration and the resonant part 57 resonated in third harmonic vibration of a bending mode. The piezo-resonance unit 55 employed in this case was 4.0 mm in length, 0.6 mm in width and 0.4 mm in thickness, to resonate at a third harmonic resonance frequency of 1237 kHz. FIGS. 22 to 24 illustrate absolute values of amounts of displacement along X-axis directions with resonant parts 57 having lengths l of 0.70 mm and widths W of 0.55 mm, 0.65 mm and 0.75 mm respectively.

Comparing FIGS. 22 to 24 with each other, it is understood that vibrational energy was most effectively canceled in the case of FIG. 23, conceivably because the resonance frequency of the resonant part 57 was identical to that of the piezo-resonance unit 55.

Figure 25:
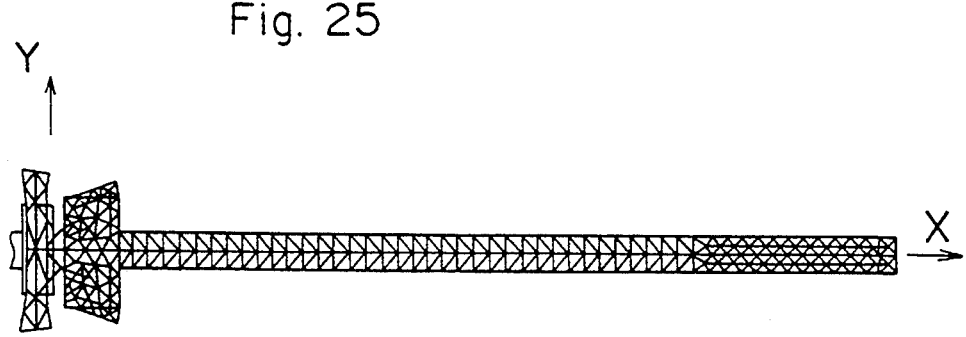
FIG. 25 illustrates displacement distribution caused when a piezo-resonance unit resonated in fundamental harmonic vibration and a resonant part vibrated in third harmonic vibration of a bending mode.

Description is now made on piezo-resonance units 55 resonating in fundamental harmonic vibration and resonant parts 57 resonating in third harmonic vibration. FIG. 25 illustrates displacement distribution of this case measured by a finite element method.

Figure 26:
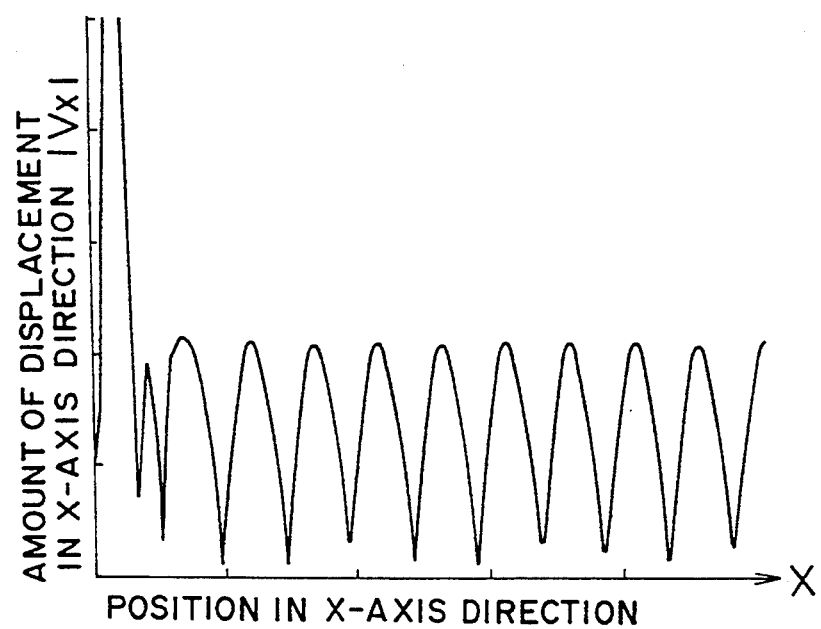
FIG. 26 illustrates absolute values of amounts of displacement along an X-axis direction in respective portions along the X-axis direction, which were measured when a piezo-resonance unit resonated in fundamental harmonic vibration and a resonant part resonated in third harmonic vibration.
Figure 27:
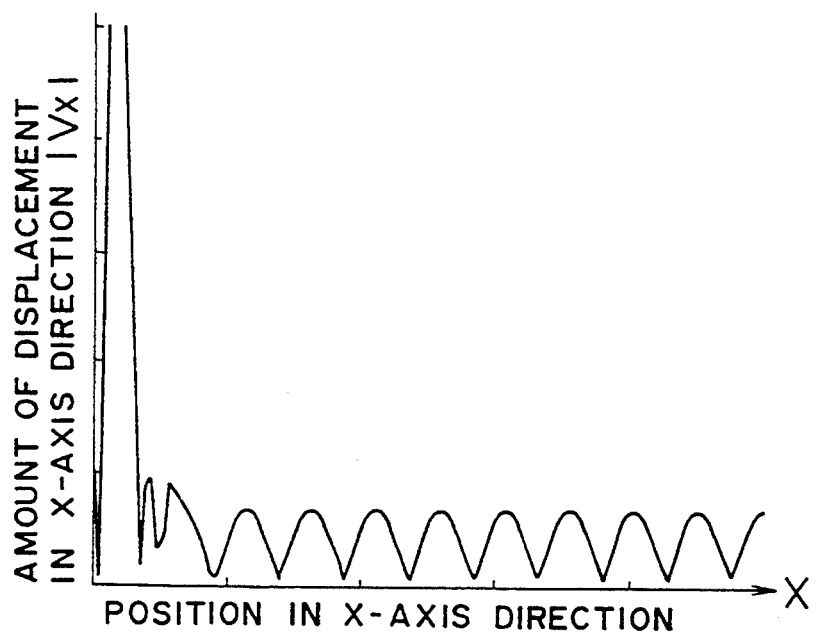
FIG. 27 illustrates absolute values of amounts of displacement along an X-axis direction in respective portions along the X-axis direction, which were measured when a piezo-resonance unit resonated in fundamental harmonic vibration and a resonant part resonated in third harmonic vibration.
Figure 28:
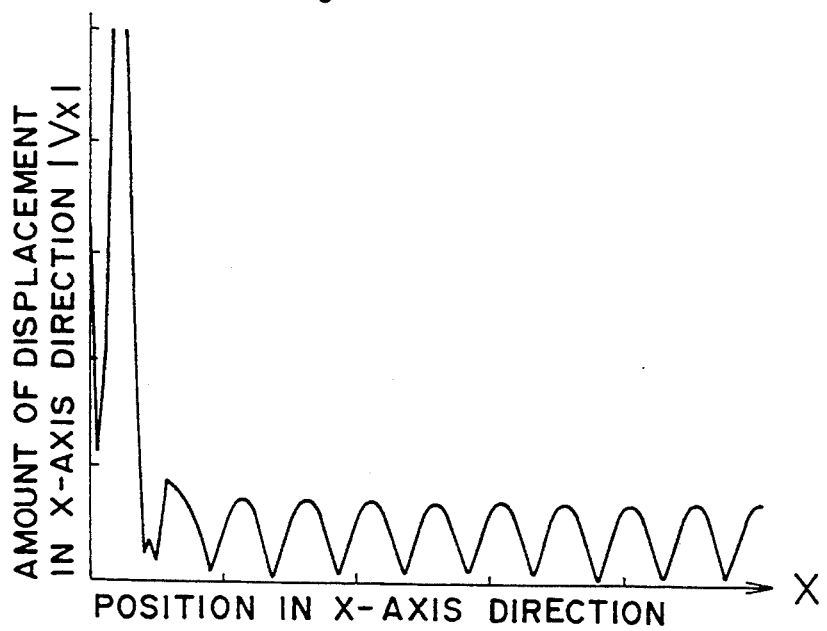
FIG. 28 illustrates absolute values of amounts of displacement along an X-axis direction in respective portions along the X-axis direction, which were measured when a piezo-resonance unit resonated in fundamental harmonic vibration and a resonant part resonated in third harmonic vibration.

Suppose that the piezo-resonance units 55 herein employed were 1.6 mm in length, 0.6 mm in width and 0.4 mm in thickness, with resonance frequencies of 1072 kHz. FIGS. 26 to 28 illustrate absolute values of amounts of displacement along X-axis directions with resonant parts 57 having widths W of 1.0 mm and lengths l of 0.65 mm, 0.70 mm and 0.75 mm respectively.

Comparing FIGS. 26 to 28 with each other, it is clearly understood that propagated vibrational energy was effectively canceled by a dynamic vibration absorbing phenomenon in the case of FIG. 27, conceivably because the fundamental harmonic resonance frequency of the piezo-resonance unit 55 was in agreement with the third harmonic resonance frequency of the resonant part 57.

Thus, it is understood that the piezo-resonance unit and the resonant part may resonate at either fundamental harmonic or third harmonic resonance frequencies.

According to the present invention, the resonant part is coupled to a portion of the vibration transfer part other than its node. Thus, propagated vibration is further effectively canceled by the resonant part. Description is now made on this point with reference to FIGS. 29 to 33.

Figure 29:
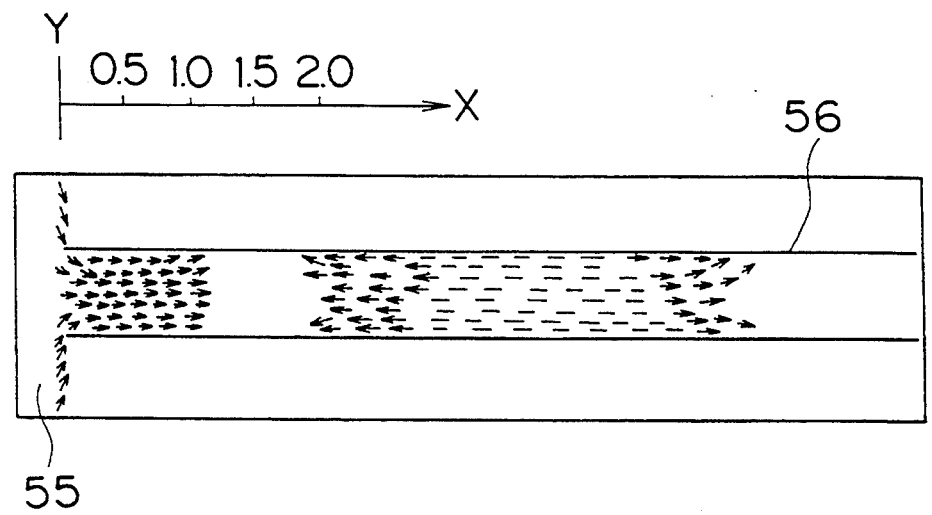
FIG. 29 illustrates a state of displacement of a vibration transfer part in the structure shown in FIG. 12.
Figure 30:
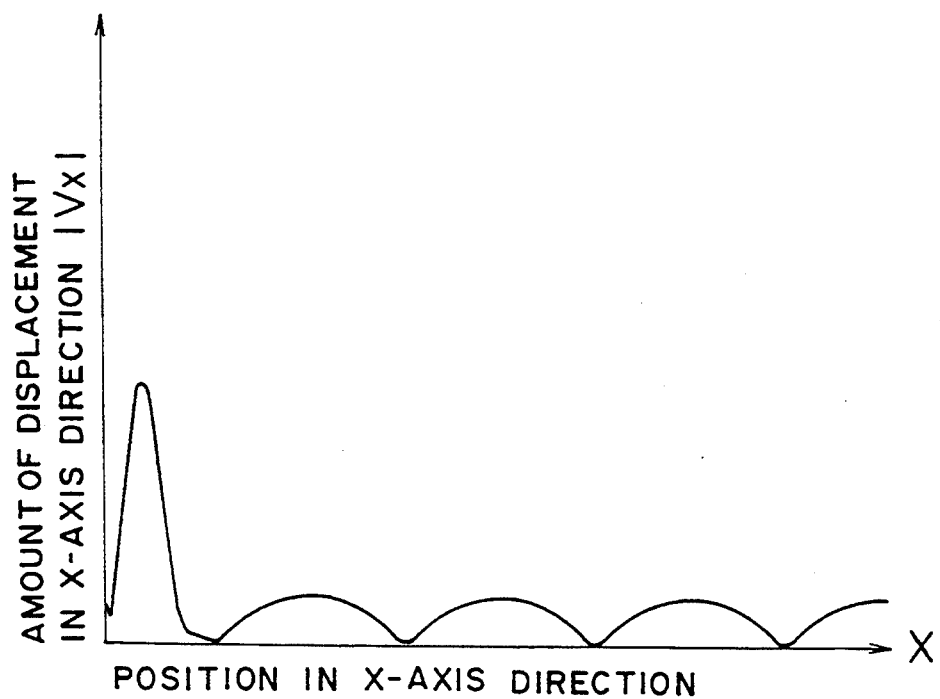
FIG. 30 illustrates absolute values of amounts of displacement in an X-axis direction in respective portions along the X-axis direction, which were measured when a distance P appearing in FIG. 12 was 0.5.
Figure 31:
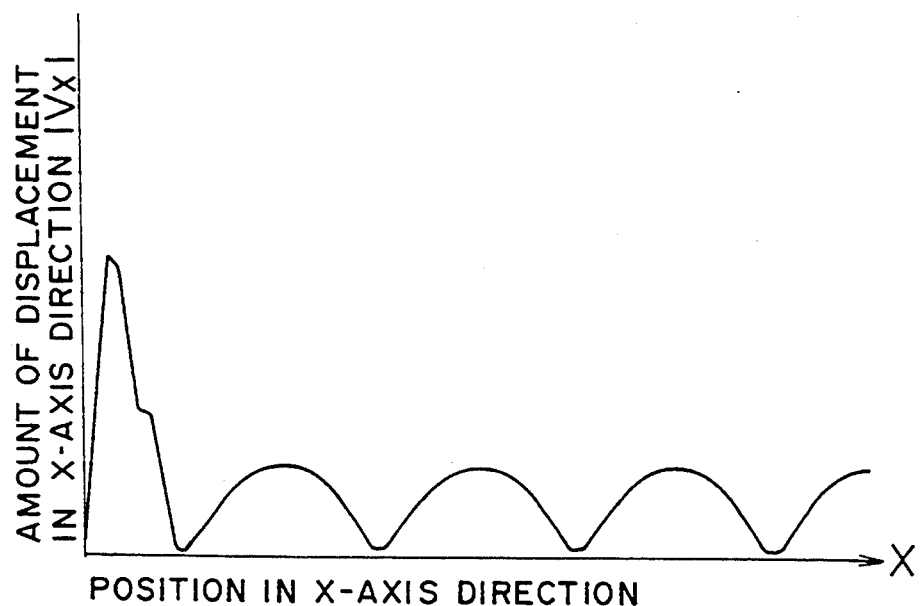
FIG. 31 illustrates absolute values of amounts of displacement in an X-axis direction in respective portions along the X-axis direction, which were measured when the distance P appearing in FIG. 12 was 1.0.

When the piezo-resonance unit 55 is allowed to resonate in the structure shown in FIG. 11, its vibration leaks to the bar 56. FIG. 29 illustrates displacement vectors appearing in the bar 56 in an enlarged manner. In other words, the bar 56 is displaced by the as-propagated vibration (longitudinal wave) as shown in FIG. 29 (arrows appearing in FIG. 29 show the displacement vectors).

As clearly understood from FIG. 29, the bar 56 has a portion which is extremely displaced by the propagated vibration, and a hardly displaced portion, i.e., a node. Namely, it is understood that the bar 56 is extremely displaced in a portion at a relative point 0.5 and hardly displaced in a portion at a relative point 1.5 along the X-axis direction, as shown in FIG. 29.

As to the piezo-resonator shown in FIG. 12, the action of the resonant part 57 was confirmed by varying a distance P between the side surface of the piezo-resonance unit 55 and the center of the resonant part 57.

FIGS. 30 to 33 illustrate absolute values of amounts of displacement in X-axis directions in respective portions along the X-axis directions measured in piezo-resonators having distances P of 0.5, 1.0, 1.5 and 2.0 respectively. It is understood from FIG. 32 that vibration of a considerable level was propagated to a portion beyond the resonant part 57. This means that the vibration cannot be sufficiently canceled by resonance when the resonant part 57 is coupled to the position at the distance P of 1.5, i.e., a node. On the other hand, it is also understood that the amounts of leakage of vibration to portions beyond the resonant parts were extremely small in FIG. 30 (distance P=0.5), FIG. 31 (distance P=1.0) and FIG. 33 (distance P=2.0). Thus, it is understood that the resonant part is preferably coupled to a portion of the vibration transfer part other than its node in the present invention, so that the as-propagated vibration can be effectively canceled by the resonant part.

Figure 32:
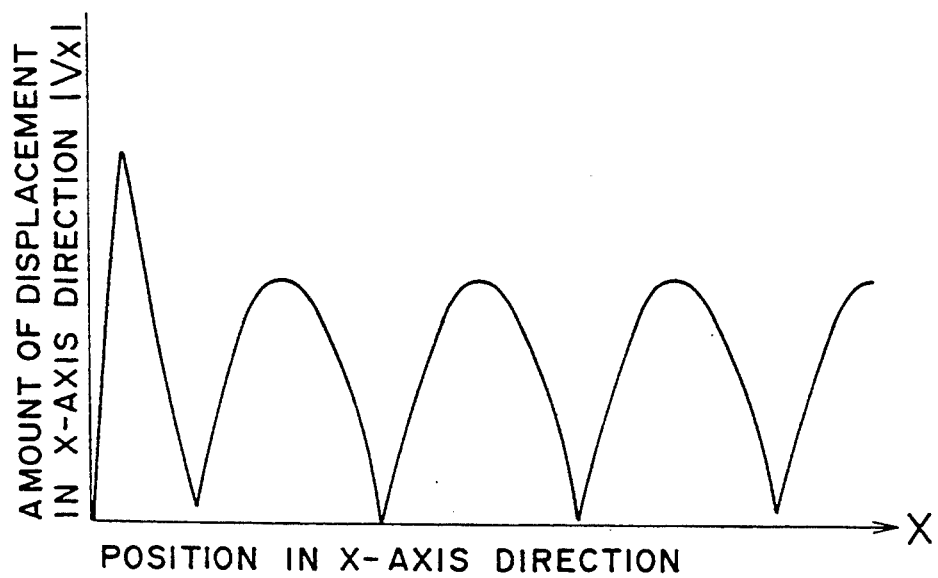
FIG. 32 illustrates absolute values of amounts of displacement in an X-axis direction in respective portions along the X-axis direction, which were measured when the distance P appearing in FIG. 12 was 1.5 (node)
Figure 33:
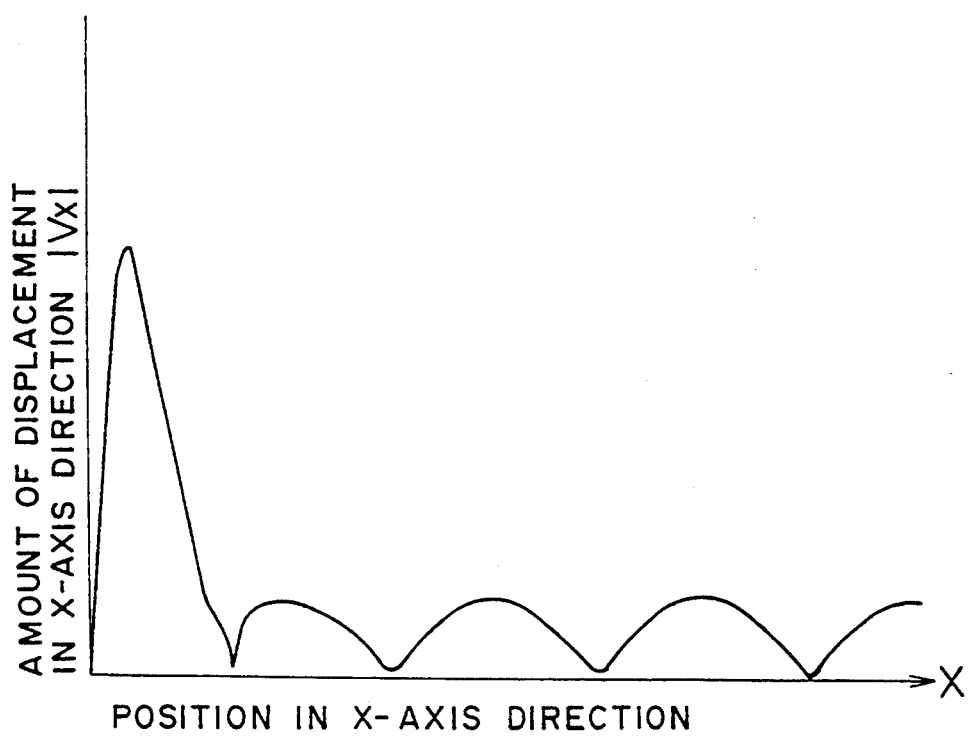
FIG. 33 illustrates absolute values of amounts displacement in an X-axis direction in respective portions along the X-axis direction, which were measured when the distance P appearing in FIG. 12 was 2.0.

Comparing FIG. 32 with FIG. 13(b), on the other hand, it is understood that leakage of vibration to the exterior was more or less suppressed even if the resonant part 57 was coupled to the node, as compared with the piezo-resonator shown in FIG. 11 having no resonant part.

Figure 34:
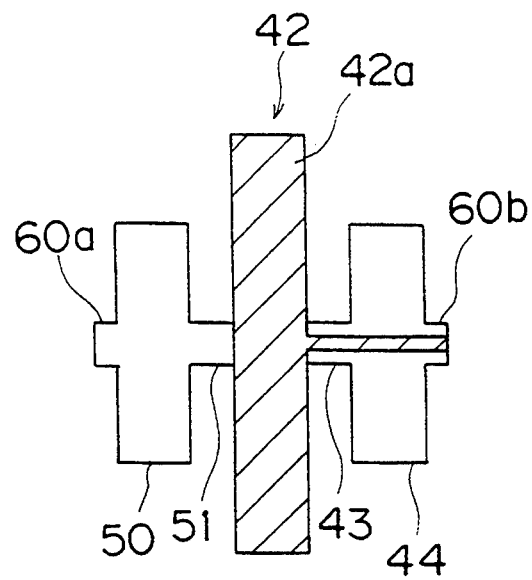
FIG. 34 is a plan view showing a modification of the piezo-resonator according to the second embodiment of the present invention.

While the holding parts 46 and 52 are coupled to outer sides of the resonant parts 44 and 50 through the coupling bars 45 and 51 in the piezo-resonator 41 according to the second embodiment shown in FIGS. 10(a) and 10(b), these parts are merely adapted to facilitate mechanical fixing of the piezo-resonator 41 in production. When coupling parts 60a and 60b for coupling with other portions are formed on sides of resonant parts 44 and 50 which are opposite to those coupled with vibration transfer parts 43 and 49 as shown in FIG. 34, vibrational energy can be trapped in portions up to the resonant parts 44 and 50 similarly to the second embodiment shown in FIGS. 10(a) and 10(b), whereby such a structure can be applied to an energy trap type piezo-resonator, similarly to the second embodiment.

Figure 35:
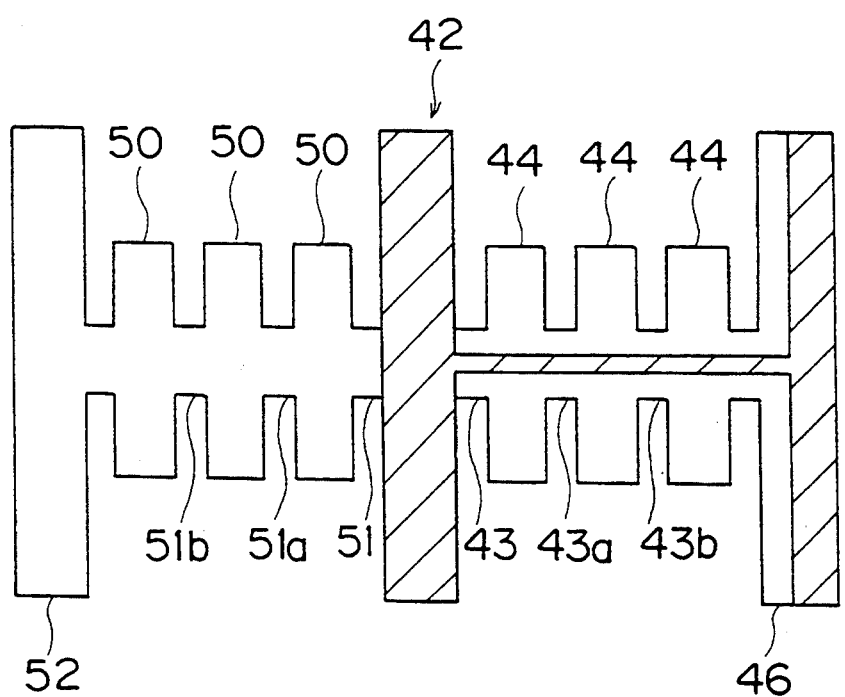
FIG. 35 is a plan view showing another modification of the piezo-resonator according to the second embodiment of the present invention, provided with a plurality of resonant parts.

While single resonant parts 44 and 50 are arranged on both sides of the piezo-resonance unit 42 in the piezo-resonator 41 according to the second embodiment shown in FIGS. 10(a) and 10(b), plural resonant parts 44 and 50 may be arranged on both sides of a piezo-resonance unit 42 respectively, as shown in FIG. 35. In this case, the plural resonant parts 44 and 50 are coupled with each other through vibration transfer parts 43a, 43b, 51a and 51b.

Embodiment as to Piezo-Resonator Utilizing Expansion Vibration Mode

FIGS. 36(a) and 36(b) are plan views showing a piezo-resonator according to a third embodiment of the present invention and an electrode provided on a lower side through a piezoelectric plate respectively.

The third embodiment is directed to a piezo-resonator 81 utilizing an expansion vibration mode of a rectangular plate. This piezo-resonator 81 has a piezo-resonance unit 82 which utilizes an expansion vibration mode of a rectangular plate. The piezo-resonance unit 82 is provided with a rectangular piezoelectric ceramic plate and electrodes 82a and 82b which are formed along overall major surfaces thereof, while the piezoelectric ceramic plate held between the electrodes 82a and 82b is uniformly polarized in the direction of its thickness.

The feature of the piezo-resonator 81 according to the third embodiment resides in such employment of the piezo-resonance unit 82 utilizing an expansion vibration mode. In other points, this piezo-resonator 81 is structured similarly to the piezo-resonator 41 according to the second embodiment. Therefore, parts of the piezo-resonator 81 shown in FIGS. 36(a) and 36(b) corresponding to those of the piezo-resonator 41 according to the second embodiment shown in FIGS. 10(a) and 10(b) are denoted by corresponding reference numerals, to omit redundant description.

In this piezo-resonator 81, an alternating voltage is applied across terminal electrodes 48a and 48b, so that the piezo-resonance unit 82 resonates in an expansion vibration mode. Also in this embodiment, the vibration of the piezo-resonance unit 82 is transferred to resonant parts 24 and 30 which are coupled to portions of vibration transfer parts 43 and 49 other than nodes thereof through the vibration transfer parts 43 and 49, whereby the resonant parts 44 and 50 resonate in bending modes at frequencies which are substantially identical to the resonance frequency of the piezo-resonance unit 82. Thus, the as-propagated vibration is canceled by such resonance of the resonant parts 44 and 50, so that the vibrational energy is trapped in portions up to the resonant parts 44 and 50.

While the resonant parts 44 and 50 are coupled to both sides of the piezo-resonance unit 82 through the vibration transfer parts 43 and 49 in the piezo-resonator 81 shown in FIGS. 36(a) and 36(b), similar resonant parts capable of resonating in bending modes may be also coupled to upper and lower portions of the piezo-resonance unit 82 through similar vibration transfer parts.

In the piezo-resonator 81 according to the third embodiment of the present invention, as hereinabove described, a piezo-resonance unit capable of resonating in various vibration modes can be employed while vibrational energy can be reliably trapped in portions up to resonant parts by coupling the resonant parts through vibration transfer parts. Thus, it is possible to obtain a piezo-resonator of an energy trap type utilizing a vibration mode, vibrational energy of which has been impossible to trap in the prior art.

Applied Examples

Figure 37:
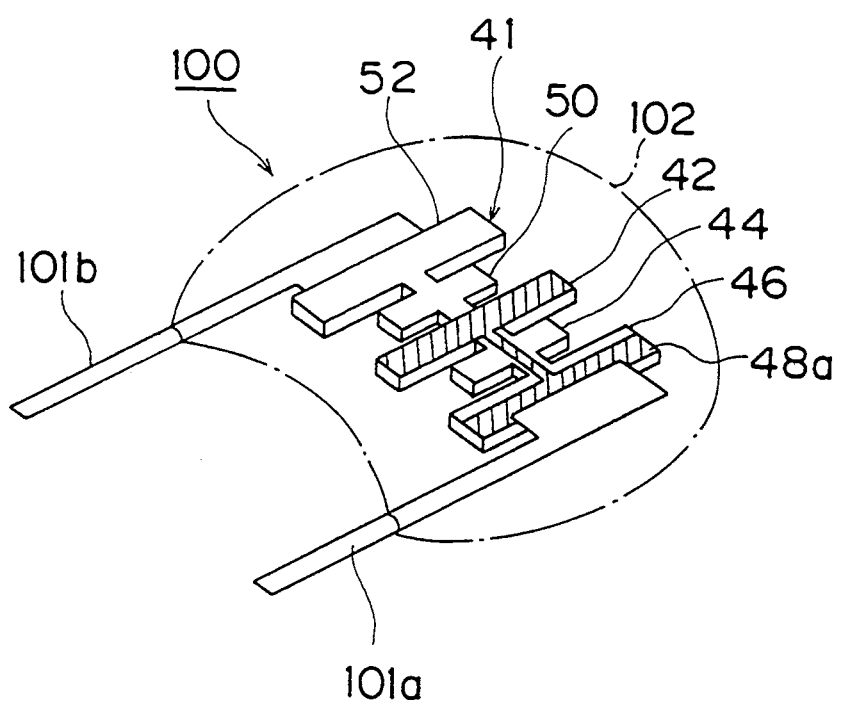
FIG. 37 is a perspective view showing an electronic component provided with lead terminals covered with a protective resin member, to which the piezo-resonator according to the second embodiment of the present invention is applied.

FIG. 37 is a schematic perspective view showing an example of the piezo-resonator according to the second embodiment, which is applied to a practical component. In such a piezo-resonance component 100, the piezo-resonator 41 shown in FIGS. 10(a) and 10(b) is formed as a component provided with lead terminals. A lead terminal 101a is bonded to a terminal electrode 48a which is formed on an upper surface of a holding part 46 of the piezo-resonator 41, while another lead terminal 101b is bonded to another terminal electrode (not shown) which is formed on a lower surface of another holding part 52. Portions except the forward end portions of the lead terminals 101a and 101b are covered with a protective resin member 102, as shown by one-dot chain lines appearing in FIG. 37. A cavity is defined in this protective resin member 102, not to inhibit vibrating portions such as the piezo-resonance unit 42 and the resonant parts 44 and 50 from vibration. Such a cavity can be defined by applying wax to the vibrating portions of the piezo-resonator 41, thereafter covering the same with the thermosetting protective resin member 102 and carrying out heat treatment.

Figure 38:
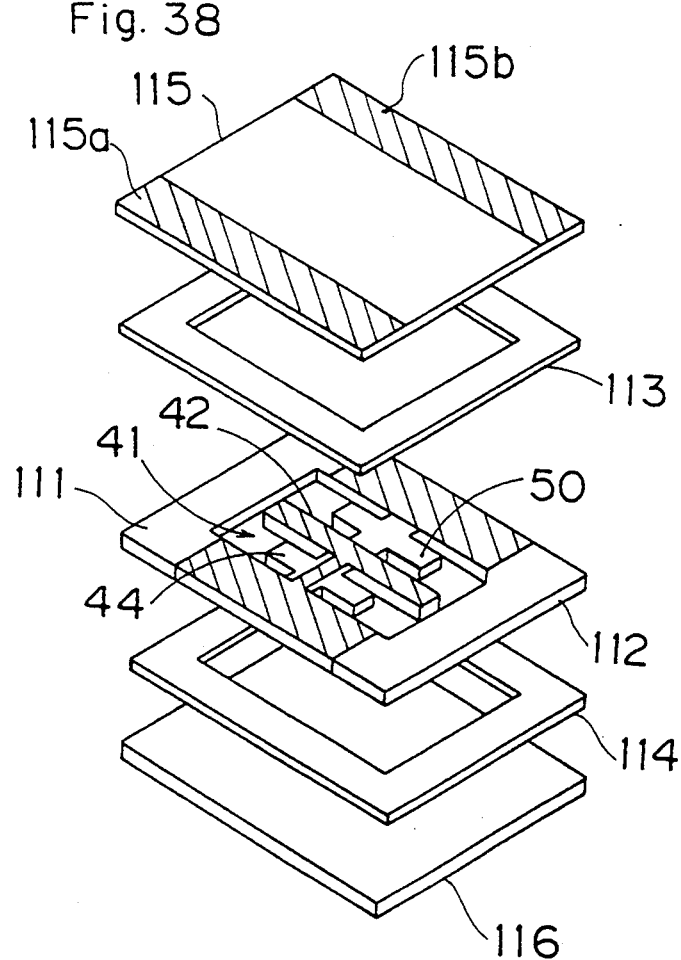
FIG. 38 is an exploded perspective view showing a chip-type piezo-resonance component formed with the piezo-resonator according to the second embodiment of the present invention.
Figure 39:
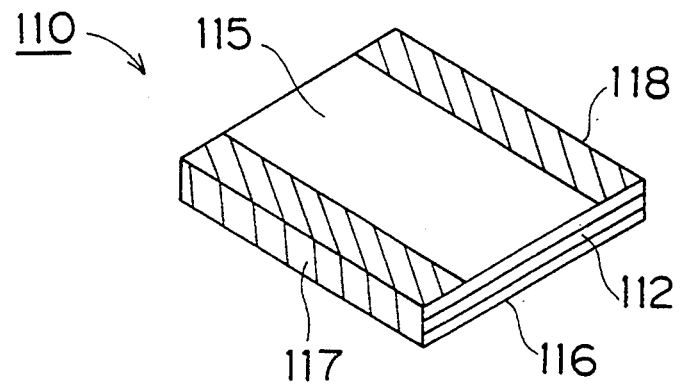
FIG. 39 is a perspective view showing a chip-type resonance component formed by the respective members shown in FIG. 38.

FIG. 38 is an exploded perspective view showing a chip-type piezo-resonance component 110 which is formed using the piezo-resonator 41 shown in FIGS. 10(a) and 10(b), and FIG. 39 is a perspective view showing the appearance of this chip-type piezo-resonance component 110.

In this piezo-resonance component 110, first and second spacer plates 111 and 112 are fixed to side portions of the piezo-resonator 41 shown in FIGS. 10(a) and 10(b) with an insulating adhesive or the like. The spacer plates 111 and 111 are formed to be substantially equal in thickness to the piezo-resonator 41.

Further, the first and second spacer plates 111 and 112 are separated from vibrating portions of the piezo-resonator 41, i.e., a piezo-resonance unit 42 and resonant parts 44 and 50, at prescribed spaces, not to be in contact with these portions, and not to inhibit these portions from vibration. The first and second spacer plates 111 and 112 are made of an insulating material such as insulating ceramics or synthetic resin, for example, having rigidity to some extent. Sheet adhesives 113 and 114 which are in the form of rectangular frames are stacked on upper and lower portions of the piezo-resonator 41 and the first and second spacer plates 111 and 112. The sheet-type adhesives 113 and 114 are adapted to stick case substrates 115 and 116 as described later to the piezo-resonator 41 and the first and second spacer plates 111 and 112.

The case substrates 115 and 116, which are made of insulating ceramics such as alumina or synthetic resin, for example, are stuck onto the piezo-resonator 41 and the first and second spacer plates 111 and 112 by the sheet-type adhesives 113 and 114.

The sheet-type adhesives 113 and 114 may be prepared from proper adhesives having rectangular frame shapes which can compression-bond the piezo-resonator 41 and the first and second spacer plates 111 and 112, being bonded to each other, with the case substrates 115 and 116, as shown in FIG. 38. Alternatively, adhesives may be applied to the lower surface of the case substrate 115 and the upper surface of the case substrate 116 in the form of rectangular frames having the same plane shapes as the sheet adhesives 113 and 114, to substitute for the sheet-type adhesives 113 and 114.

As hereinabove described, the sheet-type adhesives 113 and 114 are provided in the form of rectangular frames, in order to ensure spaces in portions above and under the piezo-resonator 41 for allowing vibration of the vibrating portions of the piezo-resonator 41.

It is clearly understood from FIG. 39 that first and second external electrodes 117 and 118 are formed to cover a pair of end surfaces of the chip-type piezo-resonance component 110 according to this embodiment, by vacuum deposition, sputtering, plating or application and baking of conductive paste.

In such formation of the first and second external electrodes 117 and 118, partial external electrodes 115a and 115b may be previously formed on the upper surface of the case substrate 115 as shown in FIG. 38 with formation of similar partial external electrodes on the lower surface of the case substrate 116, so that the external electrodes 117 and 118 are formed on a pair of end surfaces of such a laminate to electrically connect these partial external electrodes with each other on the end surfaces of the laminate.

Figure 36:
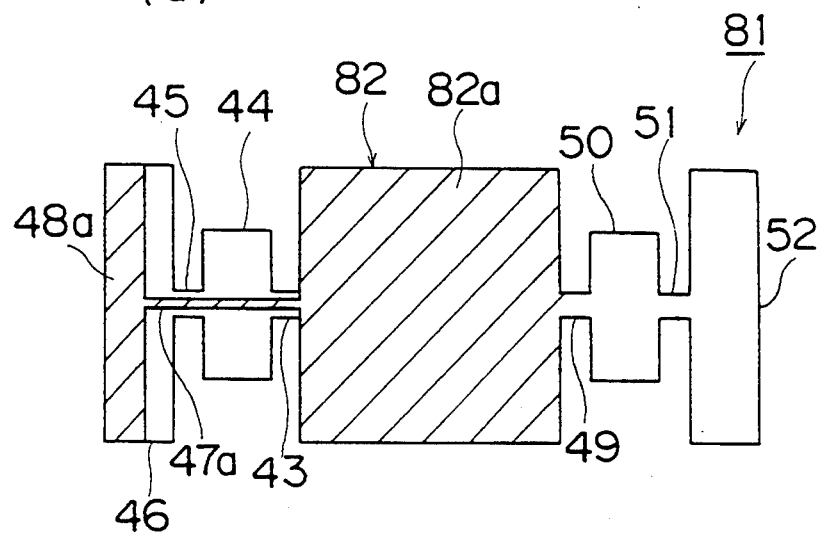
FIG. 36(a) and (b) is a plan view of a piezo-resonator according to a third embodiment of the present invention and a typical plan view showing a shape of an electrode, provided on a lower surface, through a piezoelectric plate.
Figure 36:
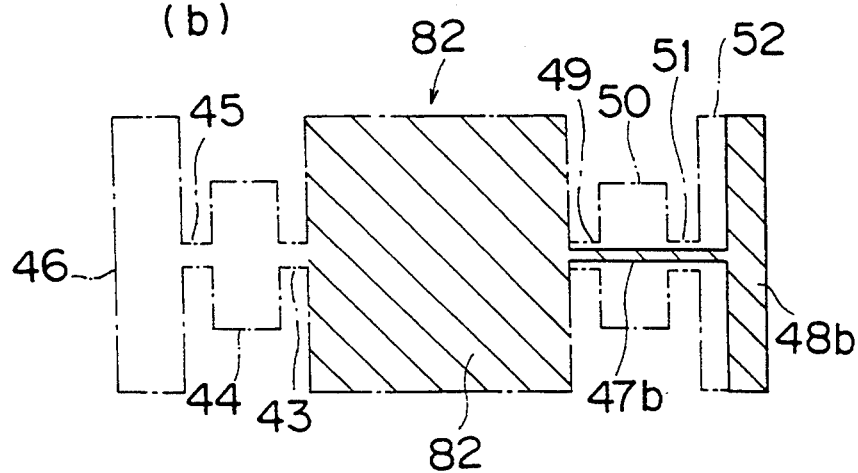
Figure 40:
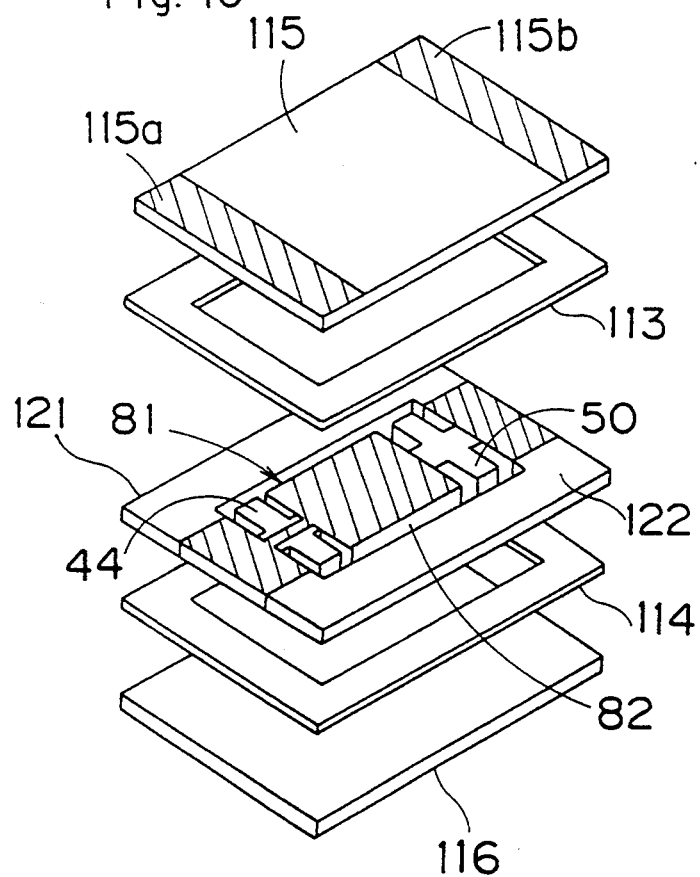
FIG. 40 is an exploded perspective view showing a chip-type piezo-resonance component formed by the piezo-resonator according to the third embodiment of the present invention.
Figure 41:
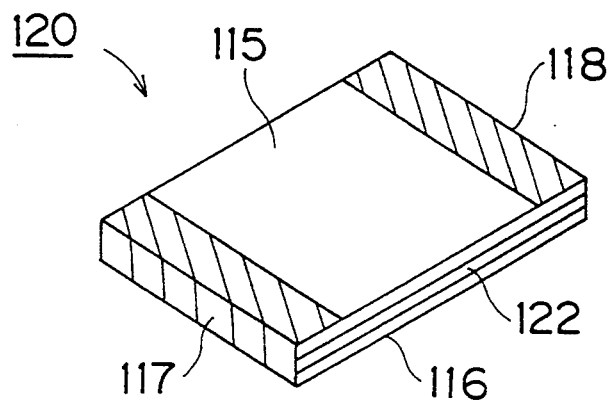
FIG. 41 is a perspective view showing the appearance of the chip-type resonance component formed by the piezo-resonator according to the third embodiment of the present invention.

FIGS. 40 and 41 are an exploded perspective view and a perspective view showing a chip-type piezo-resonance component 120 which is formed with the piezo-resonator 81 utilizing an expansion vibration mode shown in FIG. 36 and the appearance of the chip-type piezo-resonance component 120 respectively.

This chip-type piezo-resonance component 120 is structured in a similar manner to the chip-type piezo-resonance component 110 shown in FIG. 39, except that the piezo-resonator 81 is employed in place of the piezo-resonator 41 shown in FIG. 38 and first and second spacer plates 121 and 122 are bonded to side portions of the piezo-resonator 81. As to the detailed structure of the chip-type piezo-resonance component 120, therefore, the description on the chip-type piezoelectric component 110 is applied, to omit redundant description.

In the structures shown in FIGS. 38 and 40, the sheet-type adhesives 113 and 114 are employed to define spaces in the portions above and under the piezo-resonators 41 and 81 for allowing vibration, or adhesives are applied to the major surfaces of the case substrates to have the same plane shapes as the sheet type adhesives 113 and 114. Alternatively, cavities for allowing vibration of vibrating portions of the piezo-resonators 41 and 81 may be formed on the lower surfaces of the case substrates 115 and the upper surfaces of the case substrates 116, so that adhesives are applied to regions around the cavities or sheet-type adhesives in the form of rectangular frames are employed to bond the piezo-resonators 41 and 81 with the first and second spacer plates 111, 112, 121 and 122 and the case substrates 115 and 116.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vibrating unit comprising:
 a vibration source that generates vibration;

a vibration transfer part having an end coupled to said vibration source, said vibration transfer part receiving and propagating said vibration from said vibration source; and vibration cancel means coupled to said vibration transfer part for receiving the propagated vibration to vibrate in a bending mode, said vibration cancel means vibrating at a predetermined frequency such that said propagated vibration is cancelled in accordance with a dynamic vibration absorbing phenomenon, wherein said vibration cancel means is a dynamic damper that vibrates in a bending mode at a natural frequency substantially identical to a frequency of said vibration propagated from said vibration source.

2. A piezo-resonator comprising:

a piezo-resonance unit that generates vibration;

a vibration transfer part having an end coupled to said piezo-resonance unit, said vibration transfer part receiving and propagating said vibration from said piezo-resonance unit; and a dynamic damper coupled to said vibration transfer part for receiving the propagated vibration to vibrate in a bending vibration mode, said dynamic damper vibrating at a predetermined frequency such that said propagated vibration is cancelled in accordance with a dynamic vibration absorbing phenomenon, wherein said dynamic damper vibrates at a natural frequency substantially identical to that of said vibration propagated from said piezo-resonance unit.

3. A piezo-resonator in accordance with claim 2, wherein said dynamic damper is coupled to said vibration transfer part in a portion other than a node of vibration of said vibration transfer part.

4. A piezo-resonator in accordance with claim 2, further comprising:

a coupling bar having a first end coupled to said dynamic damper, and a holding part coupled to a second end of said coupling bar.

5. A piezo-resonator in accordance with claim 2, wherein said piezo-resonance unit has a piezoelectric plate, first and second excitation electrodes formed on said piezoelectric plate, and first and second vibration transfer parts are coupled to both sides of said piezo-resonance unit, said dynamic damper being formed by first and second dynamic dampers coupled to said first and second vibration transfer parts respectively so as to vibrate upon receiving vibration from said piezo-resonance unit.

6. A piezo-resonator in accordance with claim 5, further comprising:

first and second coupling bars having first ends coupled to said first and second dynamic dampers respectively, first and second holding parts coupled to second ends of said first and second coupling bars respectively, first and second terminal electrodes formed on said first and second holding parts respectively, and first and second connecting conductive parts connecting said first and second terminal electrodes with said first and second excitation electrodes.

7. A chip-type component including a piezo-resonator in accordance with claim 6, the chip-type component further comprising:

first and second spacer plates coupled between said first and second holding parts, said first and second spacer plates being structured and arranged so as not to inhibit said piezo-resonance unit, said first and second vibration transfer parts, said first and second dynamic dampers and said first and second coupling bars of said piezoelectric resonator from vibration and to enclose said elements on side portions thereof, and a pair of case substrates being structured and arranged for retaining said piezo-resonator and said first and second spacer plates so as not to inhibit vibrating portions of said piezo-resonator from vibration.

8. A piezo-resonator in accordance with claim 1, wherein said piezo-resonance unit is a piezo-resonance unit utilizing a longitudinal vibration mode.

9. A piezo-resonator in accordance with claim 1, wherein said piezo-resonance unit is a piezo-resonance unit utilizing an expansion vibration mode.

* * * * *